(12) United States Patent
Nelson et al.

(10) Patent No.: US 11,720,741 B2
(45) Date of Patent: Aug. 8, 2023

(54) ARTIFICIAL INTELLIGENCE ASSISTED REVIEW OF ELECTRONIC DOCUMENTS

(71) Applicants: Steven A. Nelson, San Jose, CA (US); Hiroshi Kitada, Tuckahoe, NY (US); Lana Wong, Belleville, NJ (US)

(72) Inventors: Steven A. Nelson, San Jose, CA (US); Hiroshi Kitada, Tuckahoe, NY (US); Lana Wong, Belleville, NJ (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/355,145

(22) Filed: Mar. 15, 2019

(65) Prior Publication Data

US 2020/0293605 A1    Sep. 17, 2020

(51) Int. Cl.
*G06F 17/00* (2019.01)
*G06F 40/117* (2020.01)
(Continued)

(52) U.S. Cl.
CPC .......... *G06F 40/117* (2020.01); *G06F 40/169* (2020.01); *G06F 40/30* (2020.01); *G06N 20/00* (2019.01)

(58) Field of Classification Search
CPC ...... G06F 40/117; G06F 40/169; G06F 40/30; G06N 20/00
See application file for complete search history.

(56) References Cited

U.S. PATENT DOCUMENTS 5,572,728 A   11/1996 Tada et al.
5,907,324 A    5/1999 Larson et al.
(Continued)

FOREIGN PATENT DOCUMENTS

CN    103123700       5/2013
EP    3 336 701 A1    6/2018
(Continued)

OTHER PUBLICATIONS

European Patent Office, "Search Report" in application No. 20162756.9-1222, dated Jun. 4, 2020, 10 pages.
(Continued)

*Primary Examiner* — Mohammed H Zuberi
(74) *Attorney, Agent, or Firm* — Hickman Becker Bingham Ledesma LLP

(57) ABSTRACT

Artificial intelligence is introduced into document review to identify content suggestions from input to generate suggested annotations for the reviewed document. An approach is provided for receiving an electronic document that contains original content from an original electronic document for review and electronic mark-ups provided by a first user. One or more electronic mark-ups that represent content suggestions proposed by the first user are identified from the electronic document. For each electronic mark-up of the one or more electronic mark-ups identified a document portion of the original content that corresponds to the electronic mark-up is identified, and an annotation is generated for the electronic mark-up comprising the electronic mark-up and a first user ID for the first user and associating the annotation to the document portion identified. The original content with one or more annotations generated from the one or more electronic mark-ups is displayed, in electronic form, within a display window.

15 Claims, 14 Drawing Sheets

(51) Int. Cl.
  *G06N 20/00* (2019.01)
  *G06F 40/30* (2020.01)
  *G06F 40/169* (2020.01)

(56) References Cited

U.S. PATENT DOCUMENTS

| | | | |
|---|---|---|---|
| 6,377,288 B1 | 4/2002 | Moran | |
| 6,501,463 B1 | 12/2002 | Dahley | |
| 6,789,064 B2 | 9/2004 | Koh | |
| 7,089,278 B1 | 8/2006 | Churchill | |
| 7,640,506 B2 | 12/2009 | Pratley | |
| 7,679,518 B1 | 3/2010 | Pabla | |
| 7,693,736 B1 | 4/2010 | Chu | |
| 8,060,563 B2 | 11/2011 | Whynot | |
| 8,090,707 B1 | 1/2012 | Orttung | |
| 8,091,028 B2 | 1/2012 | Spielberg | |
| 8,214,748 B2 | 7/2012 | Srikanth | |
| 8,368,738 B2 | 2/2013 | Schindler | |
| 8,400,489 B2 | 3/2013 | Le Goff | |
| 8,510,646 B1 | 8/2013 | Young | |
| 8,676,273 B1 | 3/2014 | Fujisaki | |
| 8,806,352 B2 * | 8/2014 | Sitrick | G06F 3/04845 715/751 |
| 8,826,147 B2 * | 9/2014 | Sitrick | G06F 40/197 715/751 |
| 8,918,722 B2 * | 12/2014 | Sitrick | G06F 40/169 715/751 |
| 8,918,724 B2 * | 12/2014 | Sitrick | G16H 30/40 715/751 |
| 8,924,859 B2 * | 12/2014 | Sitrick | G06Q 10/101 715/751 |
| 9,087,032 B1 | 7/2015 | Killalea | |
| 9,141,595 B2 * | 9/2015 | Caliman | G06F 16/951 |
| 9,158,851 B2 * | 10/2015 | Chand | G06F 16/9537 |
| 9,195,965 B2 * | 11/2015 | Sitrick | G06Q 10/101 |
| 9,204,098 B1 | 12/2015 | Cunico | |
| 9,330,366 B2 * | 5/2016 | Sitrick | G06Q 10/0631 |
| 9,401,947 B1 * | 7/2016 | Oztaskent | G06F 16/24578 |
| 9,478,702 B2 | 10/2016 | Hwang | |
| 9,621,846 B2 | 4/2017 | Lee | |
| 9,648,061 B2 | 5/2017 | Cunico | |
| 9,817,805 B1 | 11/2017 | Markman | |
| 10,009,393 B2 | 6/2018 | Tondepu et al. | |
| 10,033,774 B2 | 7/2018 | Kolter | |
| 10,073,859 B2 * | 9/2018 | Hull | G06K 9/723 |
| 10,114,810 B2 * | 10/2018 | Raleigh | G06F 40/106 |
| 10,353,997 B1 | 7/2019 | Tobias | |
| 10,375,130 B2 | 8/2019 | Malatesha et al. | |
| 10,402,485 B2 * | 9/2019 | Sitrick | G06F 40/166 |
| 10,409,919 B2 | 9/2019 | Rubin | |
| 10,522,151 B2 | 12/2019 | Cartwright | |
| 11,048,865 B2 * | 6/2021 | Tao | G06F 40/169 |
| 2002/0078088 A1 | 6/2002 | Kuruoglu | |
| 2003/0018659 A1 | 1/2003 | Fuks | |
| 2003/0187886 A1 | 10/2003 | Hull | |
| 2003/0191643 A1 | 10/2003 | Belenger | |
| 2003/0204474 A1 | 10/2003 | Capek | |
| 2003/0214528 A1 | 11/2003 | Pierce | |
| 2004/0044556 A1 | 3/2004 | Brady | |
| 2004/0139391 A1 | 7/2004 | Stumbo | |
| 2004/0141605 A1 | 7/2004 | Chen | |
| 2004/0215610 A1 | 10/2004 | Dixon et al. | |
| 2004/0230651 A1 | 11/2004 | Ivashin | |
| 2004/0236830 A1 | 11/2004 | Nelson et al. | |
| 2005/0027800 A1 | 2/2005 | Erickson | |
| 2005/0188016 A1 | 8/2005 | Vdaygiri | |
| 2005/0209848 A1 | 9/2005 | Ishii | |
| 2006/0031326 A1 | 2/2006 | Ovenden | |
| 2006/0047816 A1 | 3/2006 | Lawton | |
| 2006/0106872 A1 | 5/2006 | Leban | |
| 2006/0143558 A1 * | 6/2006 | Albornoz | G06F 40/197 715/205 |
| 2006/0224430 A1 | 10/2006 | Butt | |
| 2006/0259755 A1 | 11/2006 | Kenoyer | |
| 2006/0282266 A1 | 12/2006 | Lopez-Barquilla | |
| 2007/0106724 A1 | 5/2007 | Gorti et al. | |
| 2007/0106931 A1 | 5/2007 | Vartiainen | |
| 2007/0177062 A1 | 8/2007 | Sakon | |
| 2008/0015860 A1 | 1/2008 | Lane | |
| 2008/0022209 A1 | 1/2008 | Lyle | |
| 2008/0040187 A1 | 2/2008 | Carraher | |
| 2008/0168073 A1 * | 7/2008 | Siegel | G06F 16/58 |
| 2008/0229216 A1 | 9/2008 | Bagley | |
| 2009/0006161 A1 | 1/2009 | Chen | |
| 2009/0021486 A1 | 1/2009 | Chaudhri | |
| 2009/0094088 A1 | 4/2009 | Chen | |
| 2009/0199113 A1 | 8/2009 | McWhinnie | |
| 2009/0271438 A1 | 10/2009 | Agapi | |
| 2009/0298417 A1 | 12/2009 | Phillips | |
| 2010/0042704 A1 | 2/2010 | Chakra et al. | |
| 2010/0085415 A1 | 4/2010 | Rahman | |
| 2010/0153160 A1 | 6/2010 | Bezemer | |
| 2010/0162093 A1 * | 6/2010 | Cierniak | G06F 16/951 715/205 |
| 2010/0198644 A1 | 8/2010 | Renfro | |
| 2010/0205541 A1 | 8/2010 | Rapaport | |
| 2010/0220172 A1 | 9/2010 | Michaelis | |
| 2010/0268534 A1 | 10/2010 | Kishan et al. | |
| 2010/0268656 A1 | 10/2010 | Teicher | |
| 2010/0278453 A1 * | 11/2010 | King | G06F 40/197 715/230 |
| 2010/0309527 A1 * | 12/2010 | Mandalapu | H04N 1/00222 358/402 |
| 2010/0318399 A1 | 12/2010 | Li et al. | |
| 2011/0087491 A1 | 4/2011 | Wittenstein | |
| 2011/0182508 A1 | 7/2011 | Ives | |
| 2011/0246172 A1 | 10/2011 | Liberman | |
| 2011/0282648 A1 | 11/2011 | Sarikaya | |
| 2012/0011428 A1 | 1/2012 | Chisholm | |
| 2012/0050197 A1 | 3/2012 | Kemmochi | |
| 2012/0102409 A1 | 4/2012 | Fan | |
| 2012/0110472 A1 | 5/2012 | Amrhein | |
| 2012/0166532 A1 | 6/2012 | Juan | |
| 2012/0174002 A1 | 7/2012 | Martin et al. | |
| 2012/0179502 A1 | 7/2012 | Farooq et al. | |
| 2012/0253795 A1 | 10/2012 | Andrews | |
| 2012/0268553 A1 | 10/2012 | Talukder | |
| 2012/0271676 A1 | 10/2012 | Aravamudan | |
| 2012/0278738 A1 | 11/2012 | Kruse et al. | |
| 2012/0296914 A1 | 11/2012 | Romanov | |
| 2012/0297284 A1 | 11/2012 | Matthews | |
| 2013/0006693 A1 | 1/2013 | Haynes | |
| 2013/0036117 A1 | 2/2013 | Fisher | |
| 2013/0063542 A1 | 3/2013 | Bhay et al. | |
| 2013/0073329 A1 | 3/2013 | Shoham | |
| 2013/0132480 A1 | 5/2013 | Tsuji | |
| 2013/0144603 A1 | 6/2013 | Lord | |
| 2013/0226557 A1 | 8/2013 | Uszkoreit | |
| 2013/0227247 A1 | 8/2013 | Brody et al. | |
| 2013/0232150 A1 | 9/2013 | Gingras | |
| 2013/0237240 A1 | 9/2013 | Krantz et al. | |
| 2013/0246098 A1 | 9/2013 | Habboush | |
| 2013/0275164 A1 | 10/2013 | Gruber | |
| 2013/0275312 A1 | 10/2013 | Claman | |
| 2013/0282421 A1 | 10/2013 | Graff | |
| 2013/0290434 A1 | 10/2013 | Bank | |
| 2013/0325972 A1 | 12/2013 | Boston et al. | |
| 2014/0012574 A1 | 1/2014 | Pasupalak | |
| 2014/0012926 A1 | 1/2014 | Narayanan | |
| 2014/0055400 A1 | 2/2014 | Reuschel | |
| 2014/0067390 A1 | 3/2014 | Webb | |
| 2014/0082100 A1 | 3/2014 | Sammon et al. | |
| 2014/0108085 A1 | 4/2014 | Henriksen | |
| 2014/0136627 A1 | 5/2014 | Epstein | |
| 2014/0139426 A1 | 5/2014 | Kryze | |
| 2014/0149771 A1 | 5/2014 | Krishna | |
| 2014/0149857 A1 * | 5/2014 | Vagell | G06F 40/169 715/255 |
| 2014/0164476 A1 | 6/2014 | Thomson | |
| 2014/0165152 A1 | 6/2014 | Farouki | |
| 2014/0222853 A1 | 8/2014 | Massand | |
| 2014/0258393 A1 | 9/2014 | Bank | |
| 2014/0278377 A1 | 9/2014 | Peters et al. | |
| 2014/0278629 A1 | 9/2014 | Stephenson | |

(56) References Cited

U.S. PATENT DOCUMENTS

| | | |
|---|---|---|
| 2014/0320586 A1 | 10/2014 | Tan |
| 2014/0365203 A1 | 12/2014 | Waibel |
| 2015/0006144 A1 | 1/2015 | Uszkoreit |
| 2015/0007013 A1* | 1/2015 | Toh .................. G06F 40/169 715/230 |
| 2015/0039297 A1* | 2/2015 | Greer .................. G06F 3/0481 704/9 |
| 2015/0066501 A1 | 3/2015 | Thapliyal |
| 2015/0066505 A1 | 3/2015 | Baker |
| 2015/0067047 A1 | 3/2015 | Fu |
| 2015/0091940 A1 | 4/2015 | Emori |
| 2015/0106146 A1 | 4/2015 | Higaki |
| 2015/0112748 A1 | 4/2015 | Kaye et al. |
| 2015/0120278 A1 | 4/2015 | Waibel |
| 2015/0121466 A1 | 4/2015 | Brands |
| 2015/0149182 A1 | 5/2015 | Kalns |
| 2015/0154183 A1 | 6/2015 | Kristajansson |
| 2015/0154291 A1 | 6/2015 | Shepherd |
| 2015/0170051 A1 | 6/2015 | Bute, III et al. |
| 2015/0181020 A1 | 6/2015 | Fitzsimmons |
| 2015/0193739 A1 | 7/2015 | Min et al. |
| 2015/0271206 A1 | 9/2015 | Schultz |
| 2015/0334138 A1 | 11/2015 | Conklin |
| 2015/0370769 A1* | 12/2015 | Pereira Filho .......... G06F 16/93 726/28 |
| 2016/0070688 A1* | 3/2016 | Yao .................. G06F 40/169 715/232 |
| 2016/0071065 A1 | 3/2016 | Ohashi |
| 2016/0092419 A1* | 3/2016 | Farouki .................. G06F 40/169 715/202 |
| 2016/0092578 A1 | 3/2016 | Ganani |
| 2016/0117624 A1 | 4/2016 | Flores |
| 2016/0124742 A1 | 5/2016 | Rangasamy |
| 2016/0147399 A1 | 5/2016 | Berajawala |
| 2016/0196247 A1* | 7/2016 | Lee .................. G06F 40/169 715/753 |
| 2016/0203127 A1 | 7/2016 | Uszkoreit |
| 2016/0249096 A1 | 8/2016 | Ortiz |
| 2016/0283676 A1 | 9/2016 | Lyon |
| 2016/0294964 A1 | 10/2016 | Brune |
| 2017/0099361 A1 | 4/2017 | Digilov |
| 2017/0116185 A1 | 4/2017 | Erickson |
| 2017/0132518 A1 | 5/2017 | Kitada |
| 2017/0134446 A1 | 5/2017 | Kitada |
| 2017/0154541 A1 | 6/2017 | King |
| 2017/0185836 A1 | 6/2017 | Okumra |
| 2017/0205987 A1 | 7/2017 | Martin |
| 2017/0212882 A1* | 7/2017 | Rollins .................. G06F 40/30 |
| 2017/0213192 A1 | 7/2017 | Kitada |
| 2017/0213193 A1 | 7/2017 | Kitada |
| 2017/0255446 A1 | 9/2017 | Malatesha |
| 2017/0277784 A1 | 9/2017 | Hay |
| 2017/0286383 A1 | 10/2017 | Koul |
| 2017/0357643 A1 | 12/2017 | Kristjansson |
| 2018/0007100 A1 | 1/2018 | Krasadakis |
| 2018/0039606 A1 | 2/2018 | Lysenko |
| 2018/0039634 A1 | 2/2018 | Goldstein |
| 2018/0060289 A1 | 3/2018 | Grueneberg et al. |
| 2018/0095951 A1 | 4/2018 | Takamiya |
| 2018/0101281 A1 | 4/2018 | Nelson |
| 2018/0101760 A1 | 4/2018 | Nelson |
| 2018/0101761 A1 | 4/2018 | Nelson |
| 2018/0101823 A1 | 4/2018 | Nelson |
| 2018/0101824 A1 | 4/2018 | Nelson |
| 2018/0232705 A1 | 8/2018 | Baker |
| 2018/0246569 A1* | 8/2018 | Arakawa .................. G06F 3/013 |
| 2018/0267950 A1* | 9/2018 | de Mello Brandao ................ G06F 3/0481 |
| 2018/0285059 A1 | 10/2018 | Zurek |
| 2018/0314882 A1 | 11/2018 | Yu |
| 2018/0315429 A1 | 11/2018 | Taple |
| 2018/0365657 A1 | 12/2018 | Kitada |
| 2018/0367483 A1 | 12/2018 | Rodriguez |
| 2019/0019022 A1* | 1/2019 | Marda .................. G06V 30/418 |
| 2019/0028520 A1 | 1/2019 | Nawrocki |
| 2019/0108221 A1 | 4/2019 | Nelson |
| 2019/0108492 A1 | 4/2019 | Nelson |
| 2019/0108493 A1 | 4/2019 | Nelson |
| 2019/0108494 A1 | 4/2019 | Nelson |
| 2019/0108834 A1 | 4/2019 | Nelson |
| 2019/0156822 A1 | 5/2019 | Manuvinakurike |
| 2019/0189117 A1 | 6/2019 | Kumar |
| 2019/0272902 A1 | 9/2019 | Vozila |
| 2019/0273767 A1 | 9/2019 | Nelson |
| 2019/0295041 A1 | 9/2019 | Sim |
| 2019/0378076 A1 | 12/2019 | O'Gorman |
| 2020/0160954 A1* | 5/2020 | Lyman .................. G06K 9/3233 |
| 2020/0242151 A1 | 7/2020 | Adlersberg et al. |
| 2020/0293604 A1 | 9/2020 | Nelson |
| 2020/0293606 A1 | 9/2020 | Nelson |
| 2020/0293607 A1 | 9/2020 | Nelson |
| 2020/0293608 A1 | 9/2020 | Nelson |
| 2020/0293616 A1 | 9/2020 | Nelson |
| 2021/0272071 A1 | 9/2021 | Nelson et al. |
| 2021/0357768 A1 | 11/2021 | Kitada et al. |

FOREIGN PATENT DOCUMENTS

| | | |
|---|---|---|
| JP | 07-182365 | 7/1995 |
| JP | 07-191690 | 7/1995 |
| JP | 08-316953 | 11/1996 |
| JP | H10-269232 | 10/1998 |
| JP | 2001/005874 | 1/2001 |
| JP | 2001175720 A | 6/2001 |
| JP | 2002-207753 | 7/2002 |
| JP | 2004112518 A | 4/2004 |
| JP | 2004-112518 | 8/2004 |
| JP | 2005/202596 | 7/2005 |
| JP | 2005-277462 | 10/2005 |
| JP | 2005346515 A | 12/2005 |
| JP | 2006-085440 | 3/2006 |
| JP | 2007-336344 | 12/2007 |
| JP | 2008-099330 | 4/2008 |
| JP | 2008-152527 | 7/2008 |
| JP | 2009/515253 | 4/2009 |
| JP | 2012/103891 | 5/2012 |
| JP | 2014-143668 | 8/2014 |
| JP | 2015-154315 | 8/2015 |
| JP | 2016/526216 | 9/2016 |
| JP | 2018/142059 | 9/2018 |
| WO | WO 2014/084967 A1 | 6/2014 |
| WO | WO 2016/00010 A1 | 1/2016 |

OTHER PUBLICATIONS

European Patent Office, "Search Report" in application No. 20159759.8-1222, dated May 19, 2020, 10 pages.

European Patent Office, "Search Report" in application No. 18 196 7340.0-1230, dated May 7, 2020, 6 pages.

Erol, Bema et al., "An Overview of Technologies for e-Meeting and e-Lecture", IEEE, dated 2005, 6 pages.

Aiken, Milam et al., "Automatic Translation in Mutilingual Electronic Meetings", Translation Journal, vol. 13., No. 3, dated Jul. 2009, 9 pages.

European Patent Office, "Search Report" in application No. 20161731.3-1222, dated Jun. 9, 2020, 9 pages.

Nelson, U.S. Appl. No. 15/290,858, filed Oct. 11, 2016, Office Action, dated Mar. 30, 2020.

Nelson, U.S. Appl. No. 15/728,376, filed Oct. 9, 2017, Office Action, dated Mar. 27, 2020.

Nelson, U.S. Appl. No. 15/728,372, filed Oct. 9, 2017, Office Action, dated Mar. 6, 2020.

Nelson, U.S. Appl. No. 15/728,360, filed Oct. 9, 2017, Office Action, dated Mar. 23, 2020.

Nelson, U.S. Appl. No. 15/290,858, filed Oct. 11, 2016, Advisory Action, dated Feb. 13, 2020.

Kitada, U.S. Appl. No. 14/992,278, filed Jan. 11, 2016, Final Office Action, dated Feb. 10, 2020.

Nelson, U.S. Appl. No. 16/355,132, filed Mar. 15, 2019, Office Action, dated Jun. 2, 2020.

(56) References Cited

OTHER PUBLICATIONS

Nelson, U.S. Appl. No. 15/910,878, filed Mar. 2, 2018, Notice of Allowance, dated Apr. 16, 2020.
Nelson, U.S. Appl. No. 15/290,861, filed Oct. 11, 2016, Final Office Action, dated Apr. 23, 2020.
Nelson, U.S. Appl. No. 15/290,856, filed Oct. 11, 2016, Interview Summary, dated Apr. 22, 2020.
Kitada, U.S. Appl. No. 14/992,278, filed Jan. 11, 2016, Advisory Action, dated May 21, 2020.
Kitada, U.S. Appl. No. 16/112,361, filed Aug. 24, 2018, Office Action, dated Jan. 28, 2019.
Kitada, U.S. Appl. No. 14/992,278, filed Jan. 11, 2016, Final Office Action, dated Jan. 15, 2019.
Kitada, U.S. Appl. No. 14/992,278, filed Jan. 11, 2016, Office Action, dated Aug. 27, 2018.
Kitada, U.S. Appl. No. 15/477,240, filed Apr. 3, 2017, Office Action, dated Dec. 1, 2017.
Kitada, U.S. Appl. No. 15/477,240, filed Apr. 3, 2018, Notice of Allowance, dated May 1, 2018.
Kitada, U.S. Appl. No. 15/477,276, filed Apr. 3, 2017, Ex Parte Quaye, Apr. 20, 2018.
Kitada, U.S. Appl. No. 15/477,276, filed Apr. 3, 2017, Notice of Allowance, dated Dec. 5, 2018.
Kitada, U.S. Appl. No. 14/992,273, filed Jan. 11, 2016, Notice of Allowance, dated Dec. 27, 2016.
Kitada, U.S. Appl. No. 15/477,276, filed Apr. 3, 2017, Office Action, dated Dec. 1, 2017.
U.S. Appl. No. 14/992,273, filed Jan. 11, 2016, Office Action, dated Jul. 29, 2016.
Kitada, U.S. Appl. No. 15/477,276, filed Apr. 3, 2017, Office Action, dated Aug. 29, 2018.
Nelson, U.S. Appl. No. 15/290,855, filed Oct. 11, 2016, Office Action, dated Oct. 18, 2018.
Nelson, U.S. Appl. No. 15/290,856, filed Oct. 11, 2016, Final Office Action, dated Nov. 20, 2018.
Nelson, U.S. Appl. No. 15/290,856, filed Oct. 11, 2016, Office Action, dated May 31, 2018.
Nelson, U.S. Appl. No. 15/290,860, filed Oct. 11, 2016, Office Action, dated Nov. 16, 2018.
Nelson, U.S. Appl. No. 15/728, filed Oct. 9, 2017, Office Action, dated Feb. 25, 2019.
Nelson, U.S. Appl. No. 15/728,367, filed Oct. 9, 2017, Office Action, dated Jan. 24, 2019.
Nelson, U.S. Appl. No. 15/910,878, filed Mar. 2, 2018, Office Action, dated Oct. 3, 2019.
Nelson, U.S. Appl. No. 15/728,368, filed Oct. 9, 2017, Notice of Allowance, dated Oct. 2, 2019.
Nelson, U.S. Appl. No. 15/728,367, filed Oct. 9, 2017, Notice of Allowance, dated Sep. 6, 2019.
Nelson, U.S. Appl. No. 15/290,855, filed Oct. 11, 2016, Notice of Allowance, dated Sep. 6, 2019.
Wikipedia, the Free Encyclopedia, "Watson (Computer", https://en.wikipedia.org/wiki/Watson_(computer), last viewed on Feb. 23, 2016, 16 pages.
Tur et al., "The Calo Meeting Assistant System", IEEE Transactions on Audio, Speech and Language Processing, vol. 18, No. 6, Digital Object Identifier 10.1109/TASL, dated Aug. 2010, 11pages.
European Patent Office, "Search Report" in application No. 18196734.0-1230, dated Feb. 21, 2019, 9 pages.
European Patent Office, "Search Report" in application No. 17194726.0-1222, dated Jan. 16, 2018, 7 pages.
European Patent Office, "Search Report" in application No. 17192809.6-1958, dated Dec. 6, 2017, 9 pages.
European Patent Office, "Search Report" in application No. 16196514.0-1871, dated Jan. 30, 2017, 6 pages.
European Patent Office, "Search Report" in application No. 16194599.3-1502, dated Apr. 3, 2017, 7 pages.
The State Intellectual Property Office of P.R. China, "Search Report" in application No. 2016109782056, dated Aug. 28, 2019, 34 pages.
Olli Korjus, "Meeting Scheduling Assistant: Automatic Scheduling Between Heterogeneous Calendar Systems", dated Sep. 2012, pp. 1-115.
Nelson, U.S. Appl. No. 15/728,367, filed Oct. 9, 2017, Final Office Action, dated May 3, 2019.
Nelson, U.S. Appl. No. 15/728,367, filed Oct. 9, 2017, Advisory Action, dated May 17, 2019.
Nelson, U.S. Appl. No. 15/290,860, filed Oct. 11, 2016, Notice of Allowance, dated May 21, 2019.
Nelson, U.S. Appl. No. 15/290,858, filed Oct. 11, 2016, Office Action, dated May 1, 2019.
Nelosn, U.S. Appl. No. 15/290,855, filed Oct. 11, 2016, Final Office Action, dated May 1, 2019.
Kitada, U.S. Appl. No. 16/112,361, filed Aug. 24, 2018, Notice of Allowance, dated Jun. 7, 2019.
Nelson, U.S. Appl. No. 15/910,878, filed Mar. 2, 2018, Final Office Action, dated Jan. 9, 2020.
Nelson, U.S. Appl. No. 15/290,861, filed Oct. 11, 2016, Office Action, dated Dec. 19, 2019.
Nelson, U.S. Appl. No. 15/290,858, filed Oct. 11, 2016, Final Office Action, dated Nov. 18, 2019.
Nelson, U.S. Appl. No. 15/290,856, filed Oct. 11, 2016, Final Office Action, dated Jan. 10, 2020.
Nelson, U.S. Appl. No. 16/355,190, filed Mar. 15, 2019, Office Action, dated Jul. 28, 2020.
Nelson, U.S. Appl. No. 16/355,176, filed Mar. 15, 2019, Office Action, dated Jul. 28, 2020.
Nelson, U.S. Appl. No. 16/355,160, filed Mar. 15, 2020, Office Action, dated Jun. 26, 2020.
Nelson, U.S. Appl. No. 16/355,151, filed Mar. 15, 2019, Office Action, dated Jul. 1, 2020.
Nelson, U.S. Appl. No. 15/728,376, filed Oct. 9, 2017, Final Office Action, dated Jul. 27, 2020.
Nelson, U.S. Appl. No. 15/728,372, filed Oct. 9, 2017, Final Office Action, dated Jun. 30, 2020.
Nelson, U.S. Appl. No. 15/728,360, Fioled Oct. 9, 2017, Final Office Action, dated Jul. 28, 2020.
Nelson, U.S. Appl. No. 15/290,861, filed Oct. 11, 2016, Advisory Action, dated Jun. 26, 2020.
Nelson, U.S. Appl. No. 15/920,856, filed Oct. 11, 2016, Office Aciton, dated Aug. 21, 2019.
The State Intellectual Property Office of P.R. China, "The Notification of the First Office Action", in application No. 2016109747584, dated Jul. 3, 2019, 17 pages.
Nelson, U.S. Appl. No. 16/355,160, filed Mar. 15, 2019, Final Office Action, dated Oct. 7, 2020.
Nelson, U.S. Appl. No. 15/728,372, filed Oct. 9, 2017, Interview Summary, dated Sep. 24, 2020.
Nelson, U.S. Appl. No. 15/728,360, filed Oct. 9, 2017, Interview Summary, dated Oct. 7, 2020.
Kitada, U.S. Appl. No. 14/992,278, filed Jan. 11, 2016, Office Action, dated Aug. 26, 2020.
Nelson, U.S. Appl. No. 15/290,856, filed Oct. 11, 2016, Final Office Action, dated Nov. 9, 2020.
Nelson, U.S. Appl. No. 16/355,132, filed Mar. 15, 2019, Final Office Action, dated Nov. 4, 2020.
Nelson, U.S. Appl. No. 15/728,372, filed Oct. 9, 2017, Notice of Allowance, dated Nov. 6, 2020.
Nelson, U.S. Appl. No. 15/290,858, filed Oct. 11, 2016, Advisory Action, dated Feb. 3, 2021.
Nelson, U.S. Appl. No. 16/355,190, filed Mar. 15, 2019, Final Office Action, dated Jan. 13, 2021.
Nelson, U.S. Appl. No. 16/355,190, filed Mar. 15, 2019, Advisory Action, dated Mar. 10, 2021.
Nelson, U.S. Appl. No. 16/355,176, filed Mar. 15, 2019, Final Office Action, dated Jan. 13, 2021.
Nelson, U.S. Appl. No. 16/355,160, filed Mar. 15, 2019, Office Action, dated Jan. 22, 2021.
Nelson, U.S. Appl. No. 16/355,151, filed Mar. 15, 2019, Final Office Action, dated Jan. 8, 2021.
Nelson, U.S. Appl. No. 16/355,132, filed Mar. 15, 2019, Office Action, dated Mar. 24, 2021.

(56) References Cited

OTHER PUBLICATIONS

Nelson, U.S. Appl. No. 15/728,376, filed Oct. 9, 2017, Interview Summary, dated Mar. 25, 2021.
Nelson, U.S. Appl. No. 15/728,360, filed Oct. 9, 2017, Notice of Allowance, dated Feb. 10, 2021.
Nelson, U.S. Appl. No. 15/290,856, filed Oct. 11, 2016, Advisory Action, dated Jan. 25, 2021.
Thorisson et al., "Whiteboards: Scheduling Blackboards for Semantic Routing of Messages and Streams", Workshop on Modular Construction of Human Like Intelligence, dated Jul. 10, 2005, pp. 8-15.
Nelson, U.S. Appl. No. 16/355,132, filed Mar. 15, 2019, Final Rejection, dated Sep. 1, 2021.
Kitada, U.S. Appl. No. 14/992,278, filed Jan. 11, 2016, Notice of Allowance and Fees Due, dated Jun. 2, 2021.
Kitada, U.S. Appl. No. 14/992,278, filed Jan. 11, 2016, Notice of Allowance and Fees Due, dated Jul. 8, 2021.
Kitada, U.S. Appl. No. 14/992,278, filed Jan. 11, 2016, Notice of Allowance and Fees Due, dated Aug. 16, 2021.
Kitada, U.S. Appl. No. 14/992,278, filed Jan. 11, 2016, Notice of Allowance, dated May 26, 2021.
Nelson, U.S. Appl. No. 15/290,856, filed Oct. 11, 2016, Notice of Allowance and Fees Due, dated Nov. 29, 2021.
Nelson, U.S. Appl. No. 15/290,856, filed Oct. 11, 2016, Notice of Allowance and Fees Due, dated Dec. 9, 2021.
Nelson, U.S. Appl. No. 15/290,858, filed Oct. 11, 2016, Final Rejection, dated Dec. 21, 2021.
Nelson, U.S. Appl. No. 15/290,858, filed Oct. 11, 2016, Office Action, dated Jun. 1, 2021.
Kitada, U.S. Appl. No. 14/992,278, filed Jan. 11, 2016, Notice of Allowance and Fees Due, dated Jun. 16, 2021.
Nelson, U.S. Appl. No. 15/728,376, filed Oct. 9, 2017, Notice of Allowance and Fees Due, dated Jun. 16, 2021.
Nelson, U.S. Appl. No. 16/355,190, filed Mar. 15, 2019, Office Action, dated Jun. 2, 2021.
Nelson, U.S. Appl. No. 16/355,151, filed Mar. 15, 2019, Final Rejection, dated Oct. 26, 2021.
Nelson, U.S. Appl. No. 16/355,151, filed Mar. 15, 2019, Office Action, dated May 12, 2021.
Nelson, U.S. Appl. No. 16/355,160, filed Mar. 15, 2019, Final Office Action, dated Jul. 14, 2021.
Nelson, U.S. Appl. No. 16/355,160, filed Mar. 15, 2019, Notice of Allowance and Fees Due, dated Oct. 28, 2021.
Nelson, U.S. Appl. No. 16/355,160, filed Mar. 15, 2019, Notice of Allowance and Fees Due, dated Nov. 3, 2021.
Nelson, U.S. Appl. No. 16/355,176, filed Mar. 15, 2019, Notice of Allowance, dated Jun. 1, 2021.
Nelson, U.S. Appl. No. 16/355,190, filed Mar. 15, 2019, Notice of Allowance and Fees Due, dated Nov. 18, 2021.
Nelson, U.S. Appl. No. 16/355,190, filed Mar. 15, 2019, Notice of Allowance and Fees Due, dated Dec. 22, 2021.
Nelson, U.S. Appl. No. 15/728,376, filed Oct. 9, 2017, Notice of Allowance, dated May 7, 2021.
Steitz et al., "Managing and Communicating Operational Workflow: Designing and Implementing an Electronic Outpatient Whiteboard", Appl Clin Inform. 7(1), pg. 59-68, dated Feb. 3, 2016
Marreiros et al., "Modeling Group Decision Meeting Participants with an Agent-Based Approach," https://www.gecad.isep.ipp.pt/report0307/Papers/AIDSJournals/CRL%20-%20revista.pdf, dated 2007, 7 pages.
Nelson, U.S. Appl. No. 16/355,151, filed Mar. 15, 2019, Non-Final Rejection, dated Apr. 8, 2022.
Nelson, U.S. Appl. No. 16/355,132, filed Mar. 15, 2019, Notice of Allowance and Fees Due, dated Mar. 7, 2022.
Nelson, U.S. Appl. No. 16/355,132, filed Mar. 15, 2019, Notice of Allowance and Fees Due, dated Jun. 17, 2022.
Nelson, U.S. Appl. No. 16/355,132, filed Mar. 15, 2019, Notice of Allowance and Fees Due, dated May 18, 2022.
Nelson, U.S. Appl. No. 17/320,718, filed May 14, 2021, Non-Final Rejection, dated Aug. 19, 2022.
Nelson, U.S. Appl. No. 16/355,151, filed Mar. 15, 2019, Notice of Allowance and Fees Due, dated Oct. 3, 2022.
Kitada, U.S. Appl. No. 17/389,661, filed Jul. 30, 2021, Non-Final Rejection, dated Oct. 6, 2022.
Nunamaker et al., "Electronic Meeting Systems to Support Group Work," ACM, vol. 34, No. 7, Jul. 1991, 22 pages.
Kitada, U.S. Appl. No. 17/389,661, filed Jul. 30, 2021, Final Rejection, dated Jan. 24, 2023.

* cited by examiner

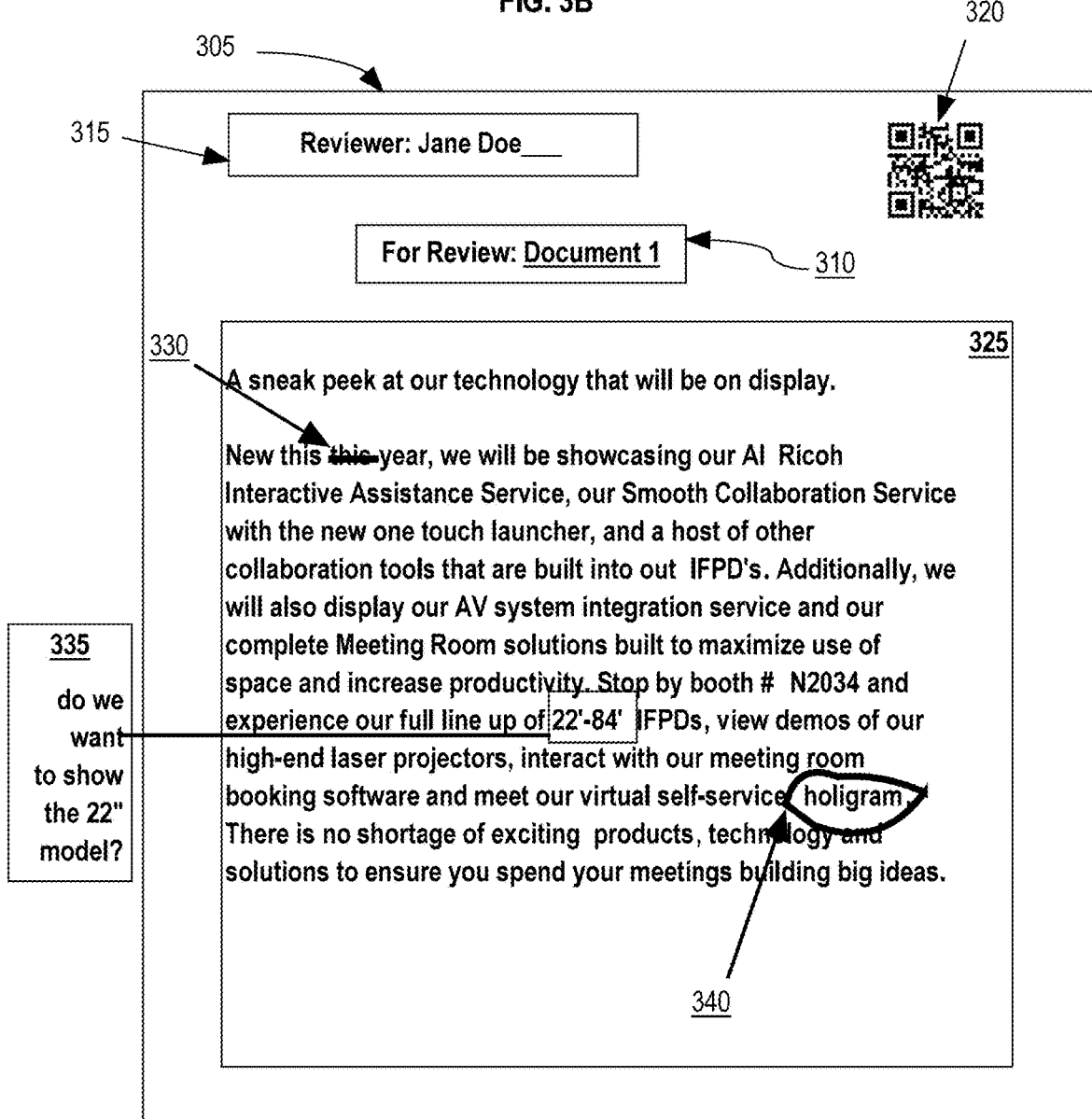

ARTIFICIAL INTELLIGENCE ASSISTED REVIEW OF ELECTRONIC DOCUMENTS

RELATED APPLICATION DATA

This application is related to U.S. patent application Ser. No. 14/992,273 entitled "Electronic Meeting Intelligence", filed Jan. 11, 2016, U.S. patent application Ser. No. 14/992,278 entitled "Electronic Meeting Intelligence", filed Jan. 11, 2016, U.S. patent application Ser. No. 15/290,855 entitled "Managing Electronic Meetings Using Artificial Intelligence and Meeting Rules Templates", filed Oct. 11, 2016, U.S. patent application Ser. No. 15/290,856 entitled "Creating Agendas for Electronic Meetings Using Artificial Intelligence", filed Oct. 11, 2016, U.S. patent application Ser. No. 15/290,858 entitled "Selecting Meeting Participants for Electronic Meetings Using Artificial Intelligence", filed Oct. 11, 2016, U.S. patent application Ser. No. 15/290,860 entitled "Real-Time (Intra-Meeting) Processing Using Artificial Intelligence", filed Oct. 11, 2016, U.S. patent application Ser. No. 15/290,861 entitled "Post-Meeting Processing Using Artificial Intelligence", filed Oct. 11, 2016, U.S. patent application Ser. No. 15/477,240 entitled "Electronic Meeting Intelligence", filed Apr. 3, 2017, U.S. patent application Ser. No. 15/477,276 entitled "Electronic Meeting Intelligence", filed Apr. 3, 2017, U.S. patent application Ser. No. 15/728,360 entitled "Person Detection, Person Identification and Meeting Start for Interactive Whiteboard Appliances", filed Oct. 9, 2017, U.S. patent application Ser. No. 15/728,367 entitled "Speech-to-Text Conversion for Interactive Whiteboard Appliances Using Multiple Services", filed Oct. 9, 2017, U.S. patent application Ser. No. 15/728,368 entitled "Speech-to-Text Conversion for Interactive Whiteboard Appliances in Multi-Language Electronic Meetings", filed Oct. 9, 2017, U.S. patent application Ser. No. 15/728,372 entitled "Attendance Tracking, Presentation Files, Meeting Services and Agenda Extraction for Interactive Whiteboard Appliances", filed Oct. 9, 2017, U.S. patent application Ser. No. 15/728,376 entitled "Interactive Whiteboard Appliances With Learning Capabilities", filed Oct. 9, 2017, U.S. patent application Ser. No. 15/910,878 entitled "Conducting Electronic Meetings over Computer Networks using Interactive Whiteboard Appliances and Mobile Devices", filed Mar. 2, 2018, U.S. patent application Ser. No. 16/112,361 entitled "Electronic Meeting Intelligence", filed Aug. 24, 2018, U.S. patent application Ser. No. 16/355,132 entitled "Artificial Intelligence Assisted Review of Physical Documents", filed Mar. 15, 2019, U.S. patent application Ser. No. 16/355,151 entitled "Generating a Meeting Review Document that Includes Links to One or More Documents", filed Mar. 15, 2019, U.S. patent application Ser. No. 16/355,160 entitled "Generating Document Edit Requests for Electronic Documents Managed by a Third Party Document Management Service using Artificial Intelligence", filed Mar. 15, 2019, U.S. patent application Ser. No. 16/355,176 entitled "Updating Existing Content Suggestions to include Suggestions from Recorded Media using Artificial Intelligence", filed Mar. 15, 2019, U.S. patent application Ser. No. 16/355,190 entitled "Generating Suggested Document Edits from Recorded Media using Artificial Intelligence", filed Mar. 15, 2019, the contents all of which are incorporated by reference in their entirety for all purposes as if fully set forth herein.

FIELD OF THE INVENTION

Embodiments relate generally to processing electronic documents, and more specifically, to computer software that analyzes suggestions and generates suggested edits for content within electronic documents. SUGGESTED GROUP ART UNIT: 2657; SUGGESTED CLASSIFICATION: 704.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

One of the most common activities in a professional and/or academic environment is review of information presented within a document. For example, in a business environment an employee may create a document containing content needing review by one or more peers. A document review meeting may be conducted to discuss the content within the document and to provide feedback related to the content.

For instance, during a document review meeting participants may convey suggested edits and comments to the document author. The document author, when receiving input from the other participants, may listen and take notes during the meeting to make sure that all feedback is noted and the feedback is applied to revising the document. Additionally, some participants may provide feedback on a printed version of the document or an electronic version of the document. The result of the review meeting may be a collection of comments and suggested edits in the form of captured notes, handwritten comments, and electronic comments. However, consolidating collected comments may be a challenge when trying to ensure all comments discussed during the meeting are accurately captured.

Based on the foregoing, there is a need for an approach for automatically receiving and identifying content suggestions from meeting participants and incorporating such suggestions into the document.

SUMMARY

According to another embodiment, an apparatus comprises one or more processors and one or more memories storing instructions. Processing of the instructions by one or more processors causes receiving a physical document that contains original content for review and mark-ups provided by a first user to generate an electronic marked-up document. From the electronic marked-up document, a user code is identified, which identifies the first user that provided the mark-ups on the physical document. A first user ID that is associated with the first user is determined based on the identified user code. One or more mark-ups that represent content suggestions proposed by the first user are identified from the generated electronic marked-up document. For each mark-up of the one or more mark-ups identified, a document portion of the original content of the electronic mark-up document that corresponds to the mark-up is identified. An annotation is generated for the mark-up comprising the mark-up and the first user ID and associating the annotation to the document portion identified. The original content with one or more annotations generated from the one or more mark-ups is displayed, in electronic form, within a display window.

According to another embodiment, an apparatus comprises one or more processors and one or more memories storing instructions. Processing of the instructions by one or more processors causes receiving an electronic document that contains original content from an original electronic document for review and electronic mark-ups provided by a first user. One or more electronic mark-ups that represent content suggestions proposed by the first user are identified from the electronic document. For each electronic mark-up of the one or more electronic mark-ups identified a document portion of the original content that corresponds to the electronic mark-up is identified, and an annotation is generated for the electronic mark-up comprising the electronic mark-up and a first user ID for the first user and associating the annotation to the document portion identified. The original content with one or more annotations generated from the one or more electronic mark-ups is displayed, in electronic form, within a display window.

According to another embodiment, an apparatus comprises one or more processors and one or more memories storing instructions. Processing of the instructions by one or more processors causes receiving one or more media content items representing captured content from a discussion of one or more electronic documents by one or more users. Portions of media content corresponding to content suggestions for the one or more electronic documents is identified from the one or more media content items. For each portion of the media content of the portions of media content a document portion is identified from the one or more electronic documents that corresponds to the portion of media content, and an annotation is generated that represents the portion of media content. The annotation is associated to a location corresponding to the document portion within a particular electronic document of the one or more electronic documents. The one or more electronic documents with their corresponding one or more generated annotations from the portions of media content is displayed, in electronic form, within a display window.

According to another embodiment, an apparatus comprises one or more processors and one or more memories storing instructions. Processing of the instructions by one or more processors causes receiving a media content item representing captured content from a discussion of an electronic document by one or more users. Portions of media content corresponding to content suggestions for the electronic document are identified from the media content item. For each portion of media content of the portions of the media content, a document portion of the electronic document that corresponds to the portion of media content is identified, and a determination is made as to whether the document portion of the electronic document is associated with an existing annotation. Upon determining that the document portion of the electronic document is associated with the existing annotation, the existing annotation is updated based on the portion of media content. The electronic document with one or more updated annotations associated with the portions of media content is displayed, in electronic form, within a display window.

According to another embodiment, an apparatus comprises one or more processors and one or more memories storing instructions. Processing of the instructions by one or more processors causes receiving content input that represents content suggestions for content within an electronic document managed by a third-party management system. One or more content suggestions are identified from the content input. For each content suggestion of the one or more content suggestions from the content input, a document portion of the electronic document that corresponds to the content suggestion is identified, and a document suggestion request for the content suggestion is generated. The document suggestion request comprises the content suggestion, a content suggestion type, an associated user ID of the user associated with the content suggestion, and an electronic document location based on the identified document portion. One or more generated document suggestion requests are sent to the third-party management system, According to an embodiment, an apparatus comprises one or more processors and one or more memories storing instructions. Processing of the instructions by one or more processors causes receiving one or more media content items representing captured content from a review meeting for one or more electronic documents. From the one or more media content items, one or more discussion topics discussed during the review meeting are identified. Portions of media content corresponding to content suggestions for the one or more electronic documents discussed during the review meeting are then identified from the one or more media content items. For each portion of media content of the portions of media content, a discussion topic of the one or more discussion topics is associated to the portion of media content and a document portion is identified, from the one or more electronic documents, that corresponds to the portion of media content. The portions of media content are aggregated based upon their associated discussion topic to generate topic sets of portions of media content. A meeting summary document is generated that includes a first section that includes a media content item player configured to play the one or more media content items and a second section that includes a list of the one or more discussion topics. Each discussion topic listed includes a corresponding topic set of portions of media content. The meeting summary document is presented within a display window.

BRIEF DESCRIPTION OF THE DRAWINGS

In the figures of the accompanying drawings like reference numerals refer to similar elements.

FIG. 3B depicts an example embodiment of a graphical user interface that displays original content of the electronic document and the identified mark-ups overlaid onto the original content.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. ARCHITECTURE
  A. DOCUMENT MANAGEMENT
  B. INTELLIGENT CONTENT RECOGNITION MODEL
    1. CONTENT RECOGNITION SERVICE
    2. MARKUP RECOGNITION SERVICE
    3. SPEECH RECOGNITION SERVICE
    4. CONTENT CORRELATION SERVICE
  C. INPUT/OUTPUT SERVICES
III. PROCEDURAL OVERVIEW
  A. PROCESSING MARKED-UP PHYSICAL DOCUMENTS
  B. PROCESSING MARKED-UP ELECTRONIC DOCUMENTS
  C. PROCESSING MEDIA CONTENT ITEMS CONTAINING SUGGESTIONS
  D. UPDATING ANNOTATIONS WITH ADDITIONAL SUGGESTIONS
  E. GENERATING THIRD-PARTY ANNOTATION REQUESTS
  F. GENERATING A MEETING SUMMARY DOCUMENT
IV. IMPLEMENTATION MECHANISMS

I. Overview

Artificial intelligence is introduced into a document review process to identify, from various different types of sources, content suggestions related to electronic documents under review. A content suggestion may represent a comment or suggested edit to content within a document under review. Content suggestions may be identified from physical notes and markups on a printed version of the document or from changes identified in an electronic version of the document. Additionally, content suggestions may be identified from captured audio and video recordings of a document review meeting. Content suggestions may also be received in the form of screenshots or other media from meeting presentation devices such as an Interactive Whiteboard Appliance or other media devices. The artificial intelligence may analyze received content input, such as physical or electronic documents and other media content, and identify content suggestions from the received content input that correspond to document portions of the document being reviewed. The artificial intelligence may determine whether the content suggestions are comments or suggested edits to the original content of the document. The artificial intelligence may generate appropriate annotations from the analyzed content suggestions and associate the annotation to a location within the original content of the document. The document, with the new annotations may then be presented to a user, such as the document author, for further review. The approaches described herein improve the efficiency of correlating external content suggestions to original content within the document. Thus providing a more efficient method for receiving content suggestions and correlating the received suggestions to their corresponding portions of the document.

II. Architecture

Figure 1:
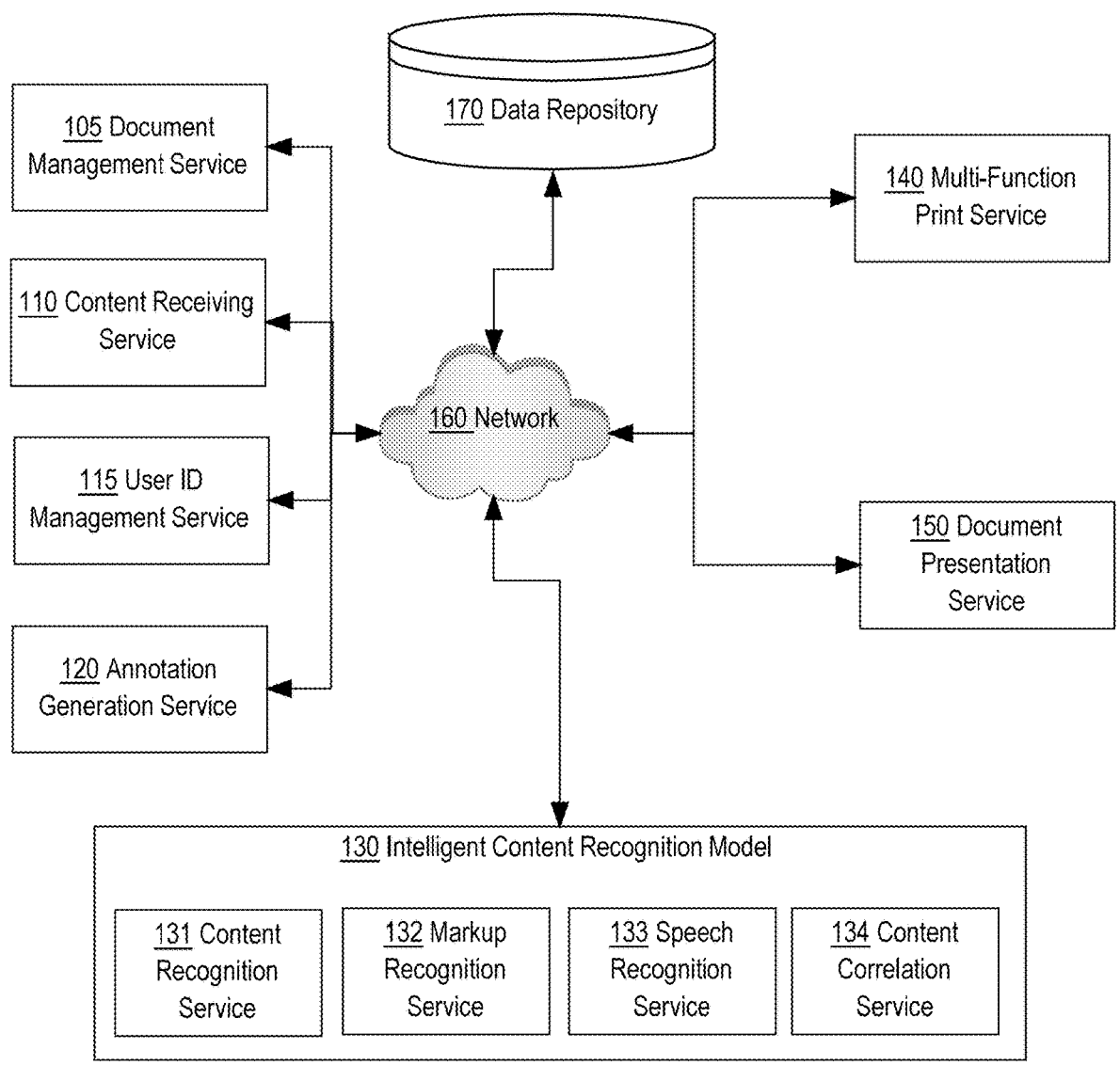
FIG. 1 depicts an example computer architecture upon which embodiments may be implemented.

FIG. 1 depicts an example computer architecture upon which embodiments may be implemented. FIG. 1 includes various examples of a document management system 100 that supports receiving and integrating external content input into an electronic representation of the document under review. Document management system 100 includes a document management service 105, a content receiving service 110, user identification management service 115, annotation generation service 120, intelligent content recognition model 130, multi-function print service 140, document presentation service 150, network 160, and data repository 170. Some elements depicted in FIG. 1 may not be depicted in other figures for the purposes of explanation, but these elements may be included in the elements of the other figures.

Document review meetings supported by document management system 100 may include any type of electronic or in-person meeting where one or more documents are reviewed by one or more participants. Document management system 100 may manage the content of the documents being reviewed and may automatically apply content suggestions and edits discussed during the meeting to the documents under review.

In an embodiment, document management system 100 represents a network of computers. A "computer" may be one or more physical computers, virtual computers, and/or computing devices. A computer may be a client and/or a server. Any reference to "a computer" herein may mean one or more computers, unless expressly stated otherwise. Each of the modules/services described in FIG. 1 may comprise a set of one or more pages of main memory, such as RAM, in one or more computers into which executable instructions have been loaded and which when executed cause document management system 100 to perform the functions or operations that are described herein with reference to those modules. For example, the document management service 105 may comprise a set of pages in RAM that contain instructions which when executed cause performing electronic document management and storage that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each component within document management system 100 also may represent one or more files or projects of source code that are digitally stored in a mass storage device such as non-volatile RAM or disk storage, within one or more computers, which when compiled or interpreted cause generating executable instructions which when executed cause document management system 100 to perform the functions or operations that are described herein with reference to those modules. In other words, the drawing figure may represent the manner in which programmers or software developers organize and arrange source code for later compilation into an executable, or interpretation into bytecode or the equivalent, for execution by document management system 100.

A. Document Management

In an embodiment, the content receiving service 110 may include instructions to receive content related to a document under review. The content receiving service 110 may receive original content, marked-up content, and/or suggested changes or comments related to the document under review. For example, the content receiving service 110 may receive an electronic file containing the original document for review. In another example, the content receiving service 110 may receive an electronic file containing both original content and mark-ups to the original content. In yet another example, the content receiving service 110 may receive content media items, such as audio files, video files, or image files, that contain suggested changes or comments related to the document under review.

The content receiving service 110 may be configured to send the received electronic document to the document management service 105. In an embodiment, the document management service 105 may include instructions to identify original content for a received electronic document, identify content as markups to the original document, associate users to their corresponding mark-ups, and otherwise manage storage and communication of content and content suggestions for electronic documents. For example, content receiving service 110 may send an electronic document representing an original version of a document to the document management service 105. The document management service 105 may identify from the electronic file, original content that represents the original version of the document for review. In another example, the content receiving service 110 may send a version of the document that contains marked-ups to the document management service 105. The document management service 105 may compare the content from the marked-up version of the document to the original content of the document previously received in order to identify one or more mark-ups within the marked-up version of the document.

In an embodiment, the document management service 105 may identify one or more codes and/or marks on the marked-up version of the document that indicate a user that made the mark-ups. For example, the marked-up version of the document received by the content receiving service 110 may have originated from a printed version of the document that contained a custom barcode or QR code identifying a specific user. Printed versions of the document may include custom ID codes that may be used to identify a specific user as the reviewer who made handwritten marks. The document management service 105 may identify the code within the marked-up version of the document and may send the identified code to the user ID management service 115 to identify a specific user associated with the code.

In an embodiment, the user ID management service 115 may include instructions to identify users associated with custom ID codes within a marked-up document. The data repository 170 may be configured to store associations between users and custom ID codes. The user ID management service 115 may communicate with the data repository 170 to retrieve user-to-ID code associations in order to determine which user is associated with a custom ID code on a received marked-up document. For example, the content receiving service 110 may receive a marked-up document that contains a specific ID code. The content receiving service 110 may send the document to the document management service 105. The document management service 105 may identify, within the document, the specific ID code and may send the specific ID code to the user ID management service 115. The user ID management service 115 may receive the specific ID code and may query the data repository 170 to determine a specific user associated with the specific ID code. Upon determining the specific user associated with the specific ID code, the user ID management service 115 may send an identifier for the specific user to the document management service 105 so that the document management service 105 may associate markups from the received electronic document to the appropriate user that made the markups.

In an embodiment, the annotation generation service 120 may include instructions to generate one or more annotations and associate the annotations to positions within the original content of the document. For example, the document management service 105 may manage original content for the document and identified markups for the document. The document management service 105 may send a request to the annotation generation service 120. The annotation generation service 120 may receive the request and may generate a new annotation that contains the identified markup and may associate the newly generated annotation to a position within the original content corresponding to a document portion that corresponds to the identified mark-up. In another example, the annotation generation service 120 may receive a request to update an existing annotation to include additional markups. The annotation generation service 120 may identify the existing annotation and may insert the additional markup into the existing annotation.

In an embodiment, generating a new annotation and/or updating an existing annotation is not limited to creating and/or updating comments. An annotation may also refer to suggested edits to content within the document. For example, if a mark-up indicates changing the word "impossible" to "highly unlikely" then the annotation generation service 120 may receive a request to update the word "impossible" from the original content to "highly unlikely." The annotation generation service 120 may generate a suggested edit annotation that represents the mark-up and may also include comments indicating the suggested edit and the user who suggested the edit.

FIG. 3B depicts an example embodiment of a graphical user interface that displays original content of the electronic document and the identified mark-ups overlaid onto the original content. Annotations 330A and 340A represent annotations that are suggested edits generated by the annotation generation service 120. Annotations 330A and 340A are based upon mark-ups that have been interpreted as suggested edits. Annotation 330A is based upon mark 330, which represents a strikethrough over the word "this." The strikethrough may be interpreted as a suggestion to delete the word "this". Annotation 340A is based upon mark 340, which represents a hand drawn circle around the word "holigram". The word "holigram" is a misspelling of the word "hologram" and mark 340 may be interpreted as a suggestion to correct the spelling of "hologram". Annotation 335A is based upon mark 335, which represents a highlighted section of words with a line to a handwritten note that says, "do we want to show the 22″ model?". Mark 335 may be interpreted as a comment.

In an embodiment, generated annotations may be customized to reflect the annotation type. For example, annotation 335A may be colored in one particular color, such as yellow, to represent a comment annotation. Whereas, annotations 330A and 340A may be colored in another color, such as red, to represent a suggested edit annotation. In an embodiment, annotations may include the user ID of the user associated with the annotation. Annotations may also include selectable action buttons, such as check button 341 and reject button 342 within annotation 340A, which may be used to either accept or reject a suggested edit. Annotations may also include electronic links to content input that is related to the generated annotation. For example, an annotation may include an electronic link to an audio file of captured discussions related to the annotation. The electronic link may also be a link to a screenshot, or other image of a mark-up or suggested comment or change. Electronic links may also refer any type of link, hyperlink, or shortcut to a file, webpage, object, or any other destination specified by the electronic link.

In an embodiment, network 106 may represent a communication medium or mechanism that provides for the exchange of data between A and B. Example of network 160 may include, but are not limited to, a network such as a Local Area Network (LAN), Wide Area Network (WAN), Ethernet or the Internet, or one or more terrestrial, satellite or wireless networks. In an embodiment, data repository 170 may be configured to store any type of data related to documents, mark-ups, annotations, associated media content items, and any other data objects associated with document and annotation management.

B. Intelligent Content Recognition Model

In an embodiment, the intelligent content recognition model 130 may include instructions to implement one or more services configured to identify document types and document portions for received electronic documents, determine content suggested from handwritten notes, determine content suggestions from media content items, and determine correlations between content suggestions and document portions. The intelligent content recognition model 130 may comprise of a content recognition service 131, a markup recognition service 132, a speech recognition service 133, and a content correlation service 134.

In an embodiment, the intelligent content recognition model 130 may include instructions to train and execute one or more machine learning models that may be used by each of the content recognition service 131, the markup recognition service 132, the speech recognition service 133, and the content correlation service 134. The intelligent content recognition model 130 may use various machine learning algorithms and structures to implement the one or more machine learning models. Example machine learning algorithms include artificial neural networks, deep neural networks, convolution neural networks, recursive neural networks, classifiers, and other supervised or unsupervised machine learning algorithms. The proposed methods and systems may be implemented using any suitable machine learning algorithm or architectures.

1. Content Recognition Service

In an embodiment, the content recognition service 131 may include instructions configured to identify a document type for the original electronic document based upon portions of content within the document, formatting and style of the document, and other indicators within the content of the original electronic document. For example, the content recognition service 131 may receive, as input, an original electronic document that is a patent application draft. The content recognition service 131 may analyze the content of the original electronic document, including the title, section headings, formatting, keywords within content, and any other properties that may indicate the document type of document the original electronic document. For instance, if the original electronic document is a patent application draft, then the content recognition service 131 may identify and analyze names of sections, such as "Background", "Brief Description of Drawings", "Detailed Description", "Claims", and "Abstract", and determine that based on the section headings that the original electronic document is a document type for a patent application.

In an embodiment, the content recognition service 131 may be configured to implement a machine learning model configured to determine a document type of an electronic document. The machine learning model may be configured to receive, as input, the electronic document and generate an output that specifies a document type for the electronic document based upon content that includes the title, section headings, formatting, keywords within content, and any other properties of the electronic document. Additionally, the machine learning model may output a dataset of context-specific properties for the determined document type. For example, the context-specific properties may define keywords, phrases, formatting, and any other properties related to the document type that may be used to help determine suggestion type and position of received content suggestion.

In an embodiment, the machine learning model may be trained to determine the document type using a training set of data that includes a set of documents that have been categorized as specific document types based upon identified document properties that define each document type. For example, the training set of data may include documents and document identified document properties that are categorized as either patent application document types, contract document types, proposal document types, technical specification document types, and so on.

In an embodiment, the machine learning model may be configured to identify document portions from the original content that may be used when correlating mark-ups to the original content. Document portions may refer to heading titles, sections, paragraphs, sentences, specific keywords, such as product descriptions and names, and specific phrases. For example, if the document type is a technical specification document, then sections and subsections within the document may be identified as portions. Additionally, specific product keywords, such as "Interactive Assistance Service" and "IFDP" may be identified as keyword portions.

2. Markup Recognition Service

In an embodiment, the markup recognition service 132 may include instructions configured to interpret handwritten notes identified from a physical document and generate text transcriptions for the handwritten notes. For example, the markup recognition service 132 may receive, as input, an image of a handwritten note from a marked-up document that says, "can we expand on this idea". The markup recognition service 132 may analyze the image of the handwritten note, determine a meaning for the handwritten note, and generate text representing a translation of the note.

The markup recognition service 132 may determine, based on the text transcription and meaning of a handwritten note, a content suggestion type such as a comment or a suggested edit. Using the current example, the note "can we expand on this idea" may be interpreted by the markup recognition service 132 as a comment. Whereas a handwritten note that includes a strikethrough of the word "impossible" followed by a note stating "change to 'highly unlikely'" may be interpreted as a suggested edit.

In an embodiment, the markup recognition service 132 may be configured to implement a machine learning model configured to translate handwritten notes into text. The machine learning model may be configured to receive an image of the handwritten note as input and may generate a set of translated text characters as output. In an embodiment, the machine learning model may be trained to determine a text transcription of the handwritten notes using a training set of data that includes a set of training images of handwritten notes and corresponding text transcriptions from one or more users. For example, the set of training images may include handwritten words, letters, shorthand, and other symbols that may be used by one or more users. In an embodiment, the machine learning model may be further configured to input a document type into the model. The document type input may be used to enhance text transcription accuracy by specifying a document context for each handwritten note. For instance, if the document type is a scientific paper related to chemistry, then the machine learning model may be trained to identify a handwritten note of "CO2" as a chemical compound and translate the note to "$CO_2$" or to "carbon dioxide."

In an embodiment, the machine learning model implemented by the markup recognition service 132 may be configured to assign a confidence score to text transcriptions of mark-ups. The confidence score may represent a value that defines how accurate the machine learning model output is based upon model training data. For example, the machine learning model may assign a high confidence score to the interpretation of a strikethrough of the word "this" based upon the location of the line over the word, the angle of the line, the color of the line, and whether the strikethrough is associated with other marks. Conversely, if the strikethrough of the word "this" overlapped the bottom of the word such that it was unclear whether mark is a strikethrough or an underline, then the machine learning model may assign a lower confidence score.

3. Speech Recognition Service

In an embodiment, the speech recognition service 133 may include instructions configured to translate captured speech from audio and/or video into translated text. For example, the speech recognition service 133 may receive, as input, a portion of an audio file recorded from a document review meeting. The speech recognition service 133 may analyze the audio content and determine translated text that represents the spoken words in the audio content.

In an embodiment, the speech recognition service 133 may be configured to implement a machine learning model configured to translate captured speech into translated text. The machine learning model may be configured to receive input that includes a media content item represented the captured speech to be translated. The machine learning model may generate, as output the text transcription of the captured speech. In an embodiment, the machine learning model may be trained using a set of training data, which may include portions of speech and corresponding text transcriptions. For example, the training data may include spoken phrases by multiple different users and their corresponding meanings. The spoken phrases within the training data may also include attributes such as, accent, subject matter, and identified background noises that may affect how speech is translated.

In an embodiment, the machine learning model of the speech recognition service 133 may be configured to identify portions of media content that indicate content suggestions for either comments or suggested edits. The speech detected in the media content item may be translated from speech into text. The text may then be analyzed for specific words or phrases that may indicate either suggested edits or comment for reviewed documents. For example, statements such as "the word . . . is duplicated," "we need more examples," "the introduction is too short," "the word . . . is misspelled," and "could you update figure X," may indicate that a specific portion of the media content relates to a suggested edit or a comment for the document. The machine learning model may also identify statements that may indicate a position within a document, such as "on the second page," "the final paragraph," "the sentence starting with," and so on. The output of the machine learning model may include a set of portions of media content identified as potential suggested edits for the documents reviewed.

In an embodiment, the machine learning model implemented by the speech recognition service 133 may be configured to assign a confidence score to text transcriptions of the set of portions of media content identified. The confidence score may represent a value that defines how accurate the machine learning model output is based upon model training data. Determining the confidence score may be based on the clarity of the speech within the portions of media content and how well the machine learning model is able to match translated words and phrases to the spoken speech in the portions of media content. For instance, if speech is garbled or the speaker speaks too quickly, then the machine learning model may assign a lower confidence score to the translated text.

4. Content Correlation Service

In an embodiment, the content correlation service 134 may include instructions configured to identify matches between document portions of the electronic document and translated text from handwritten notes, captured speech, screenshot images, and any other medium. For example, the content correlation service 134 may receive as input the original content of the electronic document and a text transcription of the content suggestion, which may be from a handwritten markup or from captured speech. The content correlation service 134 may identify document portions within the original content and may determine whether one or more document portions match the text transcription of a content suggestion. Additionally, the content correlation service 134 may receive input specifying the document type, which may be used to further determine matches between the text transcription and the document portions of the original content.

In an embodiment the content correlation service 134 may be configured to implement a machine learning model configured to determine matches between the text transcription and the document portions. Input for the machine learning model may include the original content of the document, a document type, and the text transcription that represents a content suggested from a handwritten note or from captured speech. The machine learning model may output a document portion and/or a positional location within the original content that corresponds to the text transcription. For instance, if the electronic document type is a research paper and the text transcription equals "reference 49 is incorrect", the machine learning model may determine that the text transcription refers a reference footnote within the electronic document based upon the document type and identified document portions of the document that includes footnotes. The machine learning model may output a location, within the original content, corresponding to the footnote 49. The machine learning model may have been trained using a plurality of document portions of electronic documents and corresponding text transcriptions of content suggestions from the plurality of document portions of the electronic documents.

C. Input/Output Services

Document management system 100 may include one or more input and output services for receiving documents and presenting electronic documents including interpreted annotations. In an embodiment, the multi-function print service 140 may represent one or more multi-function printer devices configured to scan physical documents. For example, the multi-function printer service may be used to scan an original document or a marked-up physical document. The multi-function print service 140 may send the scanned document, as a data object, to the content receiving service 110 for processing. In another embodiment, the multi-function print service 140 may receive requests to print physical versions of electronic documents for distribution to reviewers and other users.

In an embodiment, the document presentation service 150 may include instructions to implement a graphical user interface for presenting one or more electronic documents, including corresponding annotations. For example, the document presentation service 150 may generate a graphical user interface that includes one or more content panes for displaying content from the electronic document, the one or more annotations corresponding to the displayed content, and display option controls for filtering annotations and other content based upon a reviewer or other user.

III. Procedural Overview

The following section describes embodiments for implementing document review, including receiving and incorporating document suggestions from multiple different input services.

A. Processing Marked-Up Physical Documents

In an embodiment, the document management system 100 may be used to assist in document review by receiving document mark-ups in physical paper form, identifying content suggestions, and generating annotations for the content suggestions for the document being reviewed. Example functionality includes, without limitation, receiving one or more marked-up documents that include one or more mark-ups of content suggestions, identifying the type of content suggestion, generating annotations for each of the content suggestions, associating the generated annotations to document portions of the document under review, and displaying the document within the generated annotations within a display window.

The document management system 100 may be configured to receive an original document that contains content that has not been marked-up and determine original content for review. Original content may refer to content that is subject to review by one or more users. In an embodiment, the multi-function print service 140 may represent a scanner that receives and scans the paper document. The multi-function print service 140 may generate a scanned image, such as a Portable Document Format (PDF) file. The multi-function print service 140 may send the PDF file of the original document to the content receiving service 110. The content receiving service 110 may send the PDF file to the document management service 105, which may analyze the PDF file and identify the original content to be marked for review and the document management service 105 may store the original content within the data repository 170.

In another embodiment, the multi-function print service 140 may represent a multi-function printer within capabilities to identify the original content from a scanned physical document and store the original content within the data repository 170. For example, the multi-function print service 140 may be configured with plugin software or may utilize an application programming interface (API) to communicate within various services within the document management system 100. The API may include function calls that implement identification of original content and storage of the original content within the data repository 170.

Upon identifying the original content from the scanned physical document, the document management system 100 may generate one or more copies of the physical document that may be distributed to one or more reviewing users. In an embodiment, the document management service 105 may send a print request to generate one or more physical documents to the multi-function print service 140. The print request may include user identifiers for reviewing users. For example, if a document review meeting is scheduled with users A-D, then print request may specify users A-D such that four copies of the document are to be printed and each printed document includes an identifier identifying one of the users A-D.

In an embodiment, the document management system 100 may determine potential reviewers based upon names identified with the original content of the document. For example, if the document is a research paper with multiple authors, then the document management system 100 may identify author names and may generate one or more copies of the physical document that each includes an identifier for each of the authors.

Figure 3A:
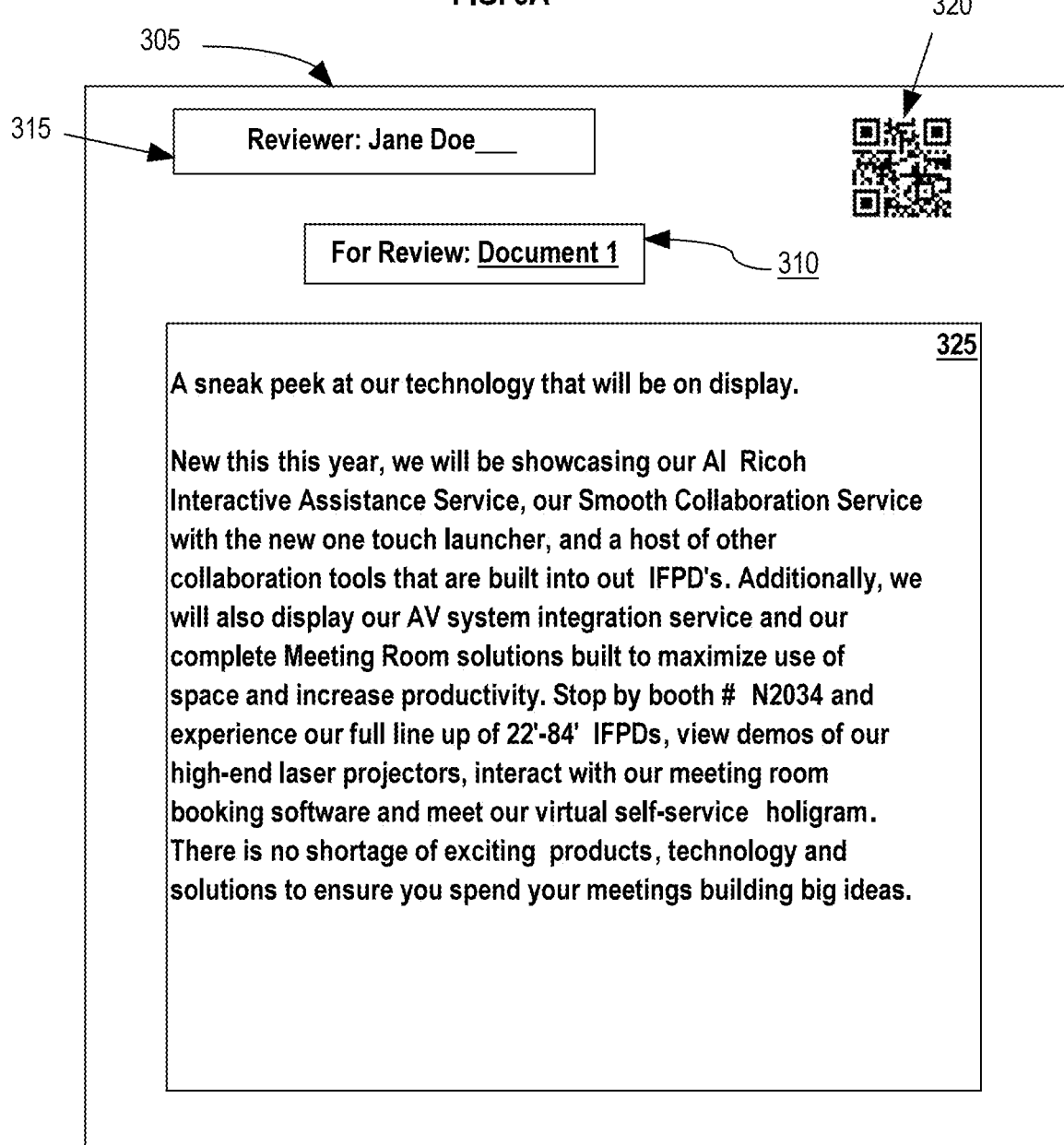
FIG. 3A depicts an example embodiment of a printed document including reviewing user identifiers.

In an embodiment, the multi-function print service 140 may print the document with either a printed name of the reviewing user, a machine-readable code identifying the reviewing user, or both. FIG. 3A depicts an example embodiment of a printed document including reviewing user identifiers. Document 305 represents a physical document printed by the multi-function print service 140. Title 310 may represent a document review title that indicates the purpose of the physical document. For example, title 310 may include the document review meeting, including a time and place for the meeting. In other examples, the title 310 may prepend "For Review:" in front of the document title. In yet other examples, title 310 may be customized to display any title for reviewing users.

Reviewer section 315 may represent a printed section that includes the name of the reviewer. For example, reviewer section 315 may display the name of the reviewing user, such as Jane Doe. Each physical copy printed may include a different reviewer name for each reviewing user. In cases where additional or not yet identified users review the printed document, the multi-function print service 140 may print copies of the document with "Reviewer: _____", where the additional user may write in his or her name.

User code 320 may represent an optional printed code, such as a QR code, barcode, or any other machine-readable code, that may be used by the document management system 100 to identify the reviewing user when a marked-up copy of the document is scanned and analyzed for suggested edits and comments. For example, the multi-function print service 140 may print a QR code that identifies reviewer Jane Doe. In examples where an additional document copy is printed without an identified user, the multi-function print service 140 may print a guest user code 320 that may be used to flag a scanned marked-up document as being reviewed by an ad-hoc reviewer. In an embodiment, if the document management system 100 identifies an ad-hoc reviewer, then the document management system 100 may analyze the handwritten name on the marked-up document to determine the identity of the user. If the user identity is not determined, then the document management system 100 may associate any mark-ups by the reviewer as "guest reviewer" which then may be manually assigned to the appropriate reviewer. Content 325 within document 305 may represent the original content to be reviewed.

The document management system 100 is not limited to printing copies of the document using the multi-function print service 140. In an embodiment, the document management service 105 may generate document files that include each of the title 310, reviewer section 315, user code 320, and content 325 for each respective reviewer and may send the document files to each reviewer for printing on a separate printing device.

Figure 2:
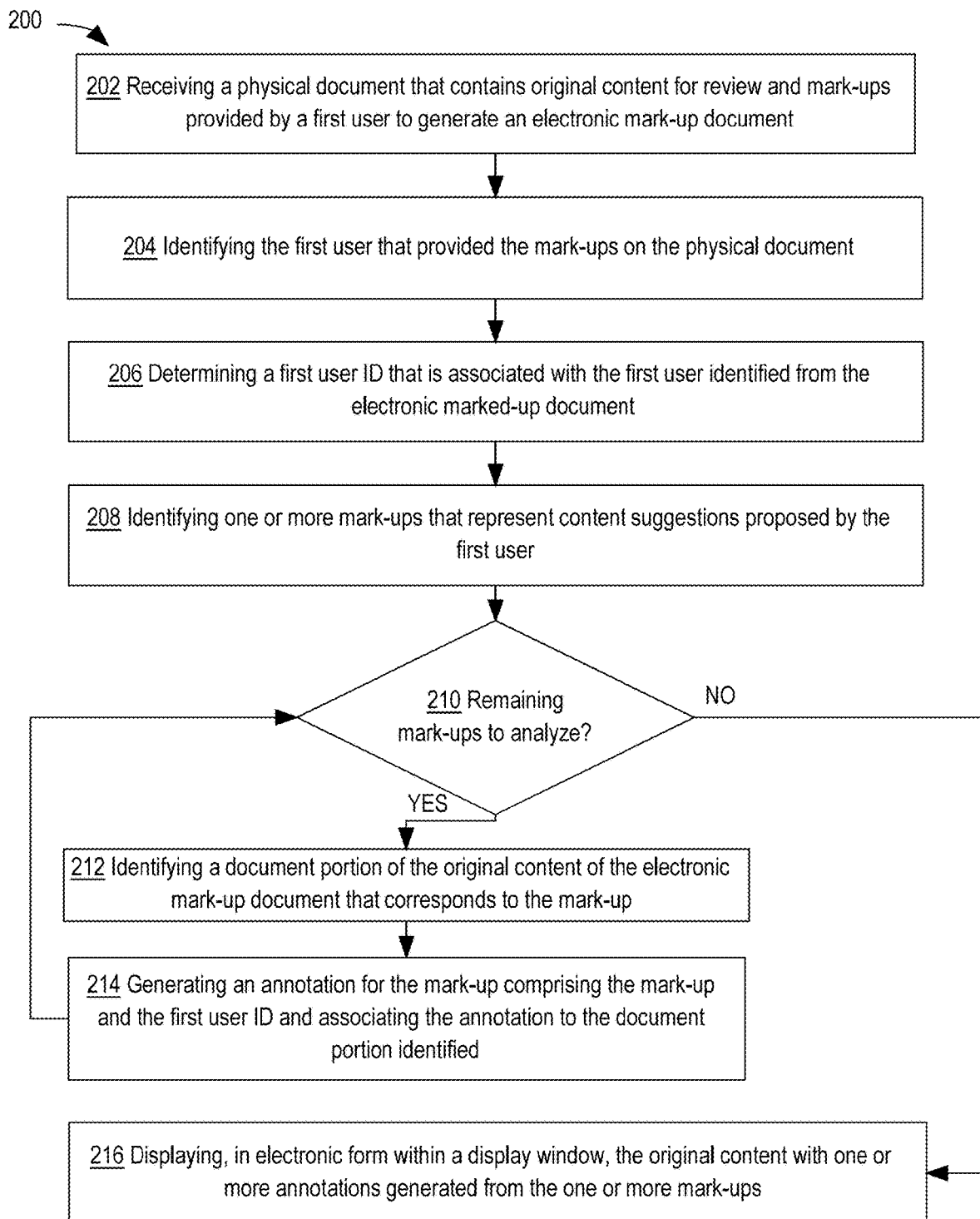
FIG. 2 is a flow diagram that depicts an approach for generating annotations based on suggested changes from a marked-up document and displaying the document with the generated annotations.

Upon printing the physical documents and distributing the documents to each respective reviewer, each reviewer may make suggested edits and comments directly on the physical document. FIG. 2 is a flow diagram that depicts an approach for generating annotations based on suggested changes from a marked-up document and displaying the document with the generated annotations. Process 200 may be performed by a single program or multiple programs. The operations of the process as shown in FIG. 2 may be implemented using processor-executable instructions that are stored in computer memory. For purposes of providing a clear example, the operations of FIG. 2 are described as performed by services of the document management system 100. For the purposes of clarity, process 200 is described in terms of a single entity.

At block 202, the document management system 100 may receive physical document that contains original content for review and mark-ups provided by a first user to generate an electronic mark-up document. In an embodiment, the multi-function print service 140 may scan the physical document that contains mark-ups to original content and send the scan, referred to as the electronic mark-up document, to the content receiving service 110. The content receiving service 110 may receive the electronic mark-up document and send the electronic mark-up document to the document management service 105.

FIG. 3B depicts an example embodiment of a marked-up physical document received by the document management system 100. In an embodiment the marked-up physical document may contain handwritten or typed mark-ups such as, written words, strikethroughs, underlines, circled words, highlights, and any other type of physical mark. Referring to FIG. 3B, document 305 refers to the same printed document depicted in FIG. 3A, including the title 310, reviewer section 315, user code 320, and content 325. The mark-ups are depicted with marks 330, 335, and 340. Mark 330 represents a strikethrough over the work "this." Mark 335 represents a highlighted section of words within content 325 and a line to handwritten notes that says, "do we want to show the 22" model?" Mark 340 represents a hand drawn circle around the word "holigram".

Referring to FIG. 2, at block 204 the document management system 100 identifies the first user that provided the mark-ups on the physical document. In an embodiment, the document management service 105 may identify the first user by identifying user code 320 from the electronic mark-up document and may send a request to the user ID management service 115 to determine the user associated with the user code 320.

In another embodiment, if the physical document does not contain user code 320 then the document management service 105 may identify the first user by identifying marks in the reviewer section 315 corresponding to a handwritten name. The document management service 105 may communicate with the markup recognition service 132 to identify the first user based upon the handwritten name. For example, the markup recognition service 132 may receive an image crop of the handwritten name from the reviewer section 315 and may analyze the image crop to determine a set of characters that represents the name of the first user.

The markup recognition service 132 is not limited to identifying the first user based on marks corresponding to a handwritten name. In another embodiment, if the physical document does not contain user code 320 then the document management service 105 may identify the first user by identifying a machine printed name in the reviewer section 315. If the physical document contained a printed name within the reviewer section 315 or a printed name near or around the reviewer section 315, then document management service 105 may communicate with the markup recognition service 132 to identify the first user based upon the printed name. For example, the markup recognition service 132 may receive an image crop of the printed name and may implement Optical Character Recognition (OCR) techniques to identify a set of characters from the image crop that represents the name of the first user.

At block 206, the document management system 100 determines a first user ID that is associated with the first user identified. In an embodiment, if the first user identified is based on the user code 320, then the user ID management service 115 may determine the first user ID by querying the data repository 170 to retrieve the associated first user ID that is associated with the user code 320. The data repository 170 may store associations between users, user codes, and user IDs, such as the user code 320 and user Jane Doe. The user ID management service 115 may receive from the data repository 170 the first user ID for Jane Doe. The first user ID may represent any type of user identifier such as an employee ID, email-based ID, or any other configured identifier used to identify users.

In another embodiment, if the first user identified is based on a transcribed handwritten name from the reviewer section 315, then the markup recognition service 132 may access the data repository 170 to determine whether a user's name matches the set of characters transcribed from the handwritten name. For instance, if the set of characters "Jane Doe" was identified by the markup recognition service 132, then the markup recognition service 132 may query the data repository 170 to determine whether a user matches the "Jane Doe" set of characters. If a user matches "Jane Doe", then the markup recognition service 132 may query the data repository 170 to retrieve the first user ID that is associated with the user "Jane Doe."

In yet another embodiment, if the first user identified is based on a transcribed handwritten name from the reviewer section 315 and the markup recognition service 132 is unable to determine with a level of confidence a set of characters that make up a user's name, then the document management service 105 may assign a first user ID corresponding to a "guest user" or an "unidentified user". The first user ID may also correspond to the "guest user" or the "unidentified user" label if the markup recognition service 132 is unable to find a matching user within the data repository 170. In an embodiment, a user may later manually assign a user ID to replace the "guest user" or the "unidentified user" label.

At block 208, the document management system 100 may identify one or more mark-ups that represent content suggestions proposed by the first user. In an embodiment, the document management service 105 may identify mark-ups in the electronic markup document by comparing the electronic mark-up document to the original content from the original document to identify the original content within the electronic mark-up document. Then the document management service 105 may identify the mark-ups in the electronic markup document by identifying content that is separate from the original content identified. For example, referring to FIG. 3B the original content may be identified as the printed content within content 325. The document management service 105 may then identify marks 330, 335, and 340 as being separate from content 325 as the one or more mark-ups. In an embodiment, the document management service 105 may be configured to treat additional printed content, such as title 310, reviewer section 315, and user code 320 as content that should be ignored since this content is not considered mark-ups or original content.

In an embodiment, the document management service 105 may use the markup recognition service 132 to analyze each of the mark-ups identified in order to determine meanings for the mark-ups. For example, a mark-up may include handwritten comments that may be translated into text and other lines or arrows within the mark-up may be analyzed to determine the meaning of the mark-up in reference to their position on the document. For example, mark-ups may be identified as lines that cross out duplicate words, add punctuation, correct misspellings, insert words, and other notes. In an embodiment, the markup recognition service 132 may implement a machine learning model configured to translate handwritten notes into text and determine a meaning for the translated text. The machine learning model may receive, as input, an image of the handwritten mark-up and may generate output comprising a text transcription of the handwritten mark-up. For mark-ups that include lines, arrows, circles, or any other non-text writing, the machine learning model may output translated text that describes the mark-up and a determination of whether the mark-up is a comment or a suggested edit. For instance, if the mark-up is a strikethrough of a word, then the output may be text indicating that the strikethrough word is to be deleted and that the mark-ups is a suggested edit. Referring to FIG. 3B, mark 330, which is a strikethrough over the word "this" may be translated into text stating "delete 'this'?".

In an embodiment, the markup recognition service 132 may be configured to determine a suggestion type for the mark-up analyzed. Suggestion types may include, but are not limited to, comments and suggested edits. Suggested edits may refer to handwritten notes or marks that indicate a suggestion to change text within the original content. For example, if a word has a strikethrough mark over the word, then the strikethrough mark may be interpreted as a suggested edit to delete the word. Other examples may include marks plus handwritten text. For instance, the word "car" may be circled and may have handwritten text next to the circle that says, "change to automobile." The handwritten text of "change to automobile" along with the circle around the word "car" may be interpreted as a suggested edit to change the word car to the word automobile.

A comment may refer to a note, question, or other commentary related to one or more words or phrases within the original content. For example, a sentence within the original content may be underlined or circled and may include a handwritten note that says, "Should we expand upon this?" This handwritten note may be determined to be a comment because it does not convey a clear suggested edit. Conversely, if the handwritten note said "please remove" next to the underlined/circled sentence, then the markup recognition service 132 may determine that the "please remove" note is a suggested edit to delete the underlined/circled sentence.

In an embodiment, the markup recognition service 132 may send output to the document management service 105. The output may include a data object that contains translated text of the handwritten mark-up, a determined mark-up type such as a suggested edit or a comment, an image of the mark-up, a confidence score that describes an assigned level of confidence for the translated text. For example, the data object representing a mark-up for an underlined sentence that includes the note "please remove" may include translated text stating the phrase "please remove," a mark-up type assigned as a suggested edit, an image crop of the underlined sentence and the handwritten note, and a confidence score associated with the translated text.

At decision diamond 210, the document management system 100 may determine whether there are remaining mark-ups to analyze. In an embodiment, the document management service 105 may be configured to iteratively analyze each of the identified mark-ups. For example, marks 330, 335, and 340 were identified and the document management service 105 may iteratively analyze each mark-up to determine a portion of the electronic document that corresponds to the mark-up. In an embodiment, if the document management service 105 determines that there are remaining mark-ups to analyze, then the document management service 105 may proceed to block 212.

At block 212, the document management system 100 identifies a document portion, from the original content that corresponds to a particular mark-up. In an embodiment, the document management system 100 may implement one or more machine learning models to identify a document type for the original content, identify specific document portions within the original content that correspond to sections, phrases, specific keywords, and any other content specific portion, and determine a correlation between the particular mark-up and a specific document portion of the original content.

In an embodiment, the content recognition service 131 may analyze the original content from the document to determine a document type. Different document types may each have specific terms, phrases, formatting that may be used to help determine how a particular mark-up is interpreted and correlates with a portion of the document. For example, if the original content is a patent application document type then a suggested edit that includes phrases such as "move limitation to a dependent" may be interpreted as a suggestion to move a claim limitation or phrase highlighted by the suggested edit from the independent claim into a new dependent claim. In an embodiment, the content recognition service 131 may implement machine learning model configured to determine a document type of an electronic document and specific document portions that make up the original content of the electronic document. The machine learning model may receive, as input, the original content from the electronic document and may output a document type for the electronic document and document portions identified from the original content.

Determining the document type may increase accuracy of determining correlations between mark-ups and portions of content, thereby improving the quality of automatically generating annotations. In an embodiment, the document management service 105 may be configured to save the output of the content recognition service 131, which includes the document type and document portions from the original content, within memory so that the determination of the document type and document portions may be performed once. Subsequent analysis of the original content and the mark-ups may refer to the stored data of the document type and document portions corresponding to the current document.

Additionally, upon determining the document type, the document management service 105 may retrieve document type attributes from the data repository 170. Document type attributes may comprise property values, such as stored keywords, phrases, formatting, and any other properties associated with the specific document type. For example, if the document type is a technical specification for Ricoh specific products, then the property values for the document type may include product acronyms, technical specification formatting, and product specific phrases determine from other technical specification documents used to train the machine learning model.

Upon determining the document portions within the original content, the document management service 105 may determine a correlation between the particular mark-up and a document portion. In an embodiment, the content correlation service 134 may identify a match between the particular mark-up and a document portion of the original content. The content correlation service 134 may use a machine learning model configured to determine matches between the text transcription of the particular mark-up and the document portions. For example, mark 335 in FIG. 3B may have been interpreted as "do we want to show the 22" model?" and may be correlated to the portion of content identified as "22'-84' IFDPs". The correlation may be based upon the highlighted portion of the mark-up and the translated text that specifies model 22" which is identified in a document portion that specifies model 22.

Upon correlating the particular mark-up to a document portion, the document management service 105 may generate an annotation for the particular mark-up. Referring to FIG. 2, at block 214 the document management system 100 may generate an annotation for the particular mark-up that comprises the text transcription of the mark-up and the first user ID and associate the annotation to the document portion identified. The annotation may be represented as a visible comment, such as a comment bubble containing the text transcription, or a suggested edit that may be represented as a tracked change. For example, if the mark-up type is determined to be a comment, then the annotation may be represented as a visible comment. If however, the mark-up is a suggested edit, then the annotation may be represented as either a tracked change or a suggested edit within a comment bubble based on the confidence score determined by the markup recognition service 132.

Figure 3C:
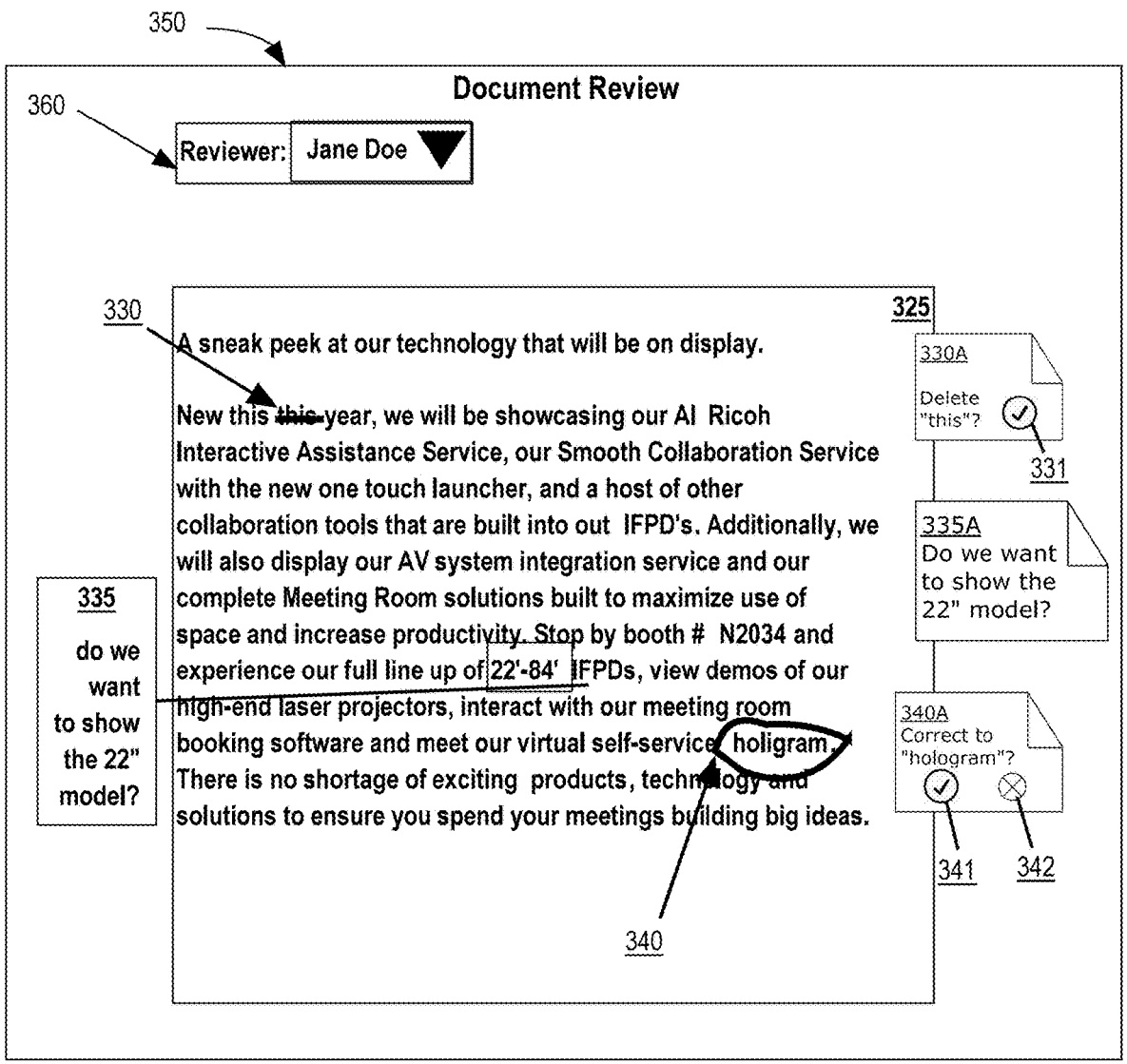
FIG. 3C depicts an example embodiment of an electronic document displayed with annotations representing identified mark-ups.

FIG. 3C depicts an example embodiment of an electronic document displayed with annotations representing identified mark-ups. Annotation 335A may represent a generated annotation for mark 335. Annotation 335A contains the translated text for the particular mark-up and an ID for the first user. In another example, annotation 330A may represent a generated annotation for mark 330. Annotation 330A may contain text stating that mark 330 represents a suggested edit to delete the duplicate word "this". If mark 330 has a high confidence score, then annotation 330A may be colored differently to indicate that the annotation 330A represents an edit that has already been applied. If however, mark 330 has a lower confidence score, then annotation 330A may be displayed as a pending change that requires user approval. In an embodiment, a confidence threshold value may be used to determine whether to apply a change associated with a suggested edit to the content. For example, if the confidence scores are based on a 100-point value scale, then the confidence threshold value may be set to 85 where confidence values above 85 are automatically applied and confidence values below 85 are not automatically applied but are displayed with accept or reject buttons within the annotation.

In an embodiment, the content correlation service 134 may be further configured to identify whether translated text of the particular mark-up contains an actionable instruction. An actionable instruction may be any type of command for external content that may be automated by the document management service 105. For example, the translated text may contain a command to "insert a picture of printer model 92XX." The content correlation service 134 may identify this command as a command to retrieve a file, link, or other object. The content correlation service 134 may send a request to execute the command to the document management service 105. The document management service 105 may receive and execute the command. For example, if the command was based on the translated text "insert a picture of printer model 92XX," then the document management service 105 may retrieve an image of the 92XX printer either from an internal repository of images or from publicly available images. In another example, the document management service 105 may retrieve a link to image search results for the 92XX printer from a publicly available search engine.

The document management service 105 may send the result of the executed command, which may be an image or a link to a page of search results, to the annotation generation service 120. The annotation generation service 120 may be configured to receive the result of the executed command and insert the result into the generated annotation for the particular mark-up. For instance, if the result is an internal or external image, the annotation generation service 120 may insert a link to the internal or external image. If the result is a link to image search results then the annotation generation service 120 may insert the search result link into the generated annotation for the particular mark-up.

In an embodiment, upon generating the annotation for the particular mark-up, the document management system 100 may store the association between the generated annotation and the identified document portion within the data repository 170.

Upon generating the annotation, the document management system 100 may proceed to decision diamond 210 to determine whether there are additional mark-ups that need to be analyzed. If there are additional mark-ups to be analyzed, the document management system 100 may repeat blocks 212 and 214 to generate annotations for each of the mark-ups. If at decision diamond 210 there are no additional mark-ups to be analyzed, the document management system 100 may proceed to block 216.

In an embodiment, the document management system 100 may repeat blocks 202-214 for each physical document received from a user that contains mark-ups. For example, if a second user, named John Smith, also provided a physical document that contains mark-ups, then the document management system 100 may receive and scan the marked-up document from John Smith, identify a user code for John Smith from the physical document, identify one or more mark-ups made by John Smith, and generate one or more annotations associated with mark-ups provided by John Smith.

At block 216, the document management system 100 may display, in electronic form within a display window, the original content with the one or more generated annotations. In an embodiment, the document management service 105 may communicate with the document presentation service 150 to generate a graphical user interface for displaying the original content with the one or more generated annotations within the display window on a client computing device. The graphical user interface may include, but is not limited to, displaying the original content of the document, the generated annotations, and the mark-ups associated with the annotations overlaid onto the display of the original content.

FIG. 3C represents an example embodiment of a graphical user interface used to display the original content of the electronic document, the identified mark-ups overlaid onto the original content, and the generated annotations. Document window 350 may represent a display element configured to display the original content of the electronic document, overlaid mark-ups, and other revisions related to the mark-ups and/or other suggested edits. Reviewer drop-down list 360 may represent a drop-down list of available reviewers that provided suggested edits for the electronic document. If a particular reviewer, such as Jane Doe, is selected from the reviewer drop-down list 360, then the graphical user interface may display mark-ups and annotations associated with reviewer Jane Doe. In an embodiment, the reviewer drop-down list 360 may include an "all reviewers" selection which, when selected, may display mark-ups and annotations from each reviewer that provided suggested edits. When displaying annotations from multiple reviewers, the document presentation service 150 may configure the graphical user interface to color code each annotation and associated mark-up based upon each reviewer. For example, if the all reviewers selection displays suggested edits from Jane Doe and John Smith, then the graphical user interface displayed may highlight mark-ups and annotations associated with Jane Doe in red and mark-ups and annotations associated with John Smith in green.

In an embodiment, annotations that represent edits suggested by a reviewer may include control buttons to either apply or reject the suggested edit. For example, annotation 330A includes a check button 331 which, when selected, applies the suggested edit of deleting the duplicate word "this" from the electronic document. In another example, annotation 340A includes a check button 341, for applying the suggested edit, and a reject button 342, for rejecting the suggested edit. Selecting check button 341 would cause the document management service 105 to change the spelling of "holigram" to the correct spelling of "hologram". Selecting reject button 342 would cause the document management service 105 to not apply the suggested edit and keep the original spelling of "holigram" in the electronic document.

A user viewing the graphical user interface may accept or reject suggested edits from reviewers by either accepting or rejecting each of the displayed annotations. In an embodiment, the document management service 105 may save the applied changes to the electronic document as a new version of the electronic document within the data repository 170. New versions of the electronic document may include one or more changes. For example, a new version of the electronic document may include all changes accepted and/or rejected during a single review session of the graphical user interface by the user. In another example, each saved version of the electronic document may include a single accepted change. In another embodiment, the document management service 105 may be configured to save each accepted or rejected annotation as a series of transactions that may be selectively applied to the electronic document in order to generate specific versions of the electronic document that contain specific changes.

B. Processing Marked-Up Electronic Documents

In an embodiment, the document management system 100 may be used to gather and consolidate document mark-ups from different electronic documents. The document management system 100 may identify content suggestions and generate annotations for content within the electronic document reviewed. For example, a document may be reviewed by multiple users using multiple different document editing programs, such as Microsoft Word for Windows, Microsoft Word for Mac, Open Office, Google Docs, PDF documents with comments, and any other document editing program. Each of the document editing programs may manage comments and edits differently such that viewing, within a single display, content suggestions from different editing programs may be challenging.

Figure 4:
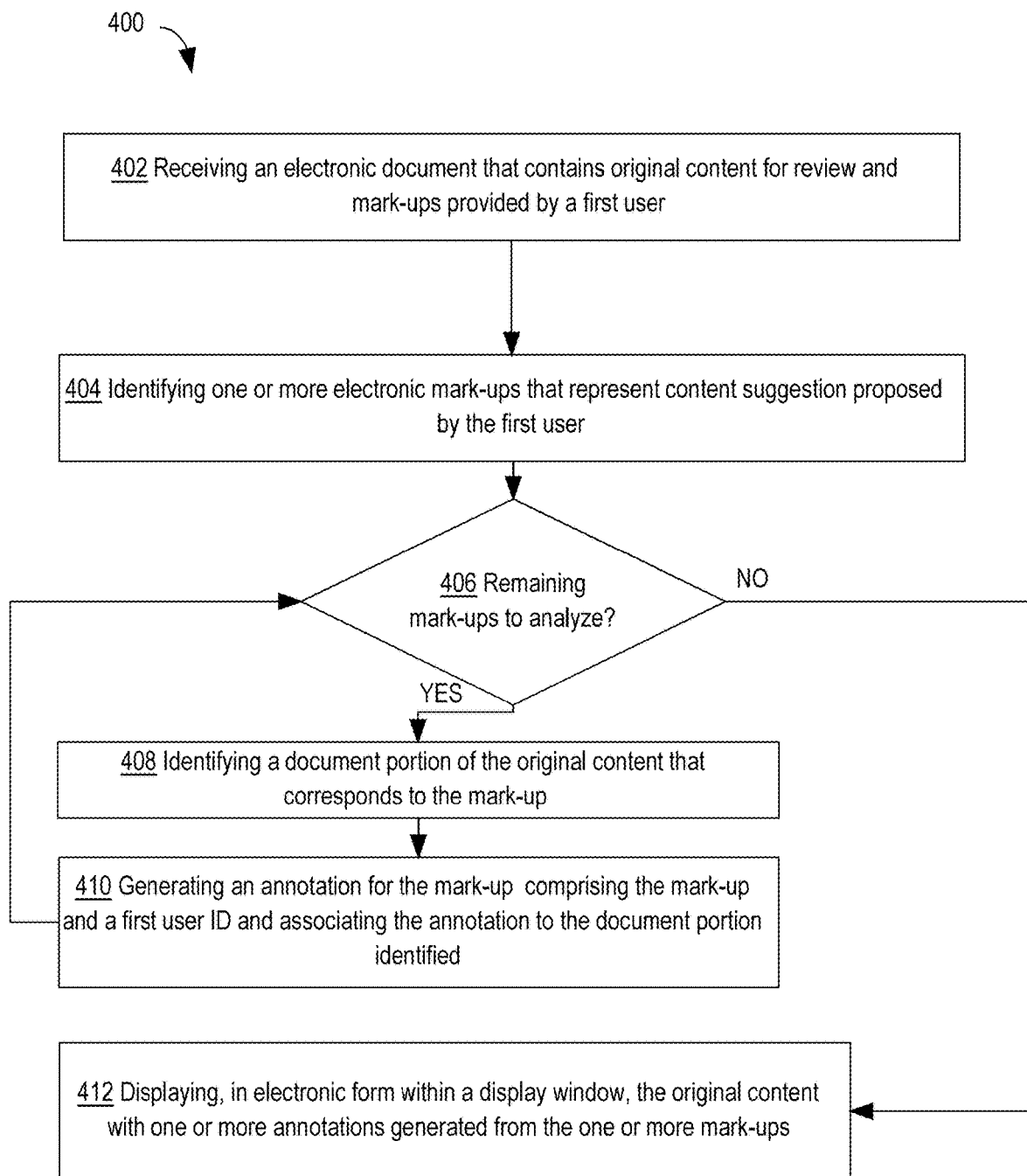
FIG. 4 is a flow diagram that depicts an approach for generating annotations based on suggestions received from a marked-up electronic document and displaying the document with the generated annotations.

The document management system 100 may receive and manage original content from an original electronic document that has not been edited or marked-up. The document management system 100 may be configured to receive and manage subsequent electronic documents received that contain the original content as well as mark-ups to the original content. FIG. 4 is a flow diagram that depicts an approach for generating annotations based on suggestions received from a marked-up electronic document and displaying the document with the generated annotations. Process 400 may be performed by a single program or multiple programs. The operations of the process as shown in FIG. 4 may be implemented using processor-executable instructions that are stored in computer memory. For purposes of providing a clear example, the operations of FIG. 4 are described as performed by services of the document management system 100. For the purposes of clarity, process 400 is described in terms of a single entity.

At block 402, the document management system 100 may receive an electronic mark-up document contains the original content for review and electronic mark-ups provided by a first user. In an embodiment, the content receiving service 110 may receive the electronic mark-up document from a reviewer such as the first user. The electronic mark-up document may be received from a direct upload to a specified website, from an email that was sent to a specific email account associated with the document management system 100, or from a network location associated with a network storage service, such as Box, Google Drive, Drop Box, or any other network storage service.

In an embodiment, the document management service 105 may associate a specific user to the received electronic mark-up document by identifying a specific identifier associated with the specific user. A specific identifier may represent the user's email address if the electronic mark-up document was emailed to the document management system 100. In another example, the specific user may edit an electronic document that has a specific filename associated with the specific user. For instance, user Jane Doe may edit and send the electronic mark-up document name "document1_userJaneDoe.doc". In yet another example, electronic documents sent to reviewing users may include embedded user codes within the document metadata or within the document's file structure. The embedded user codes may then be extracted by the document management service 105 to identify the reviewing user.

At block 404, the document management system 100 may identify one or more mark-ups that represent content suggestions proposed by the first user. In an embodiment, the document management service 105 may identify mark-ups in the electronic markup document by first identifying the original content within the electronic mark-up document by comparing the electronic mark-up document to the original content from the original electronic document. The the document management service 105 may identify the mark-ups in the electronic markup document by identifying content that is separate from the original content identified.

In an embodiment, the document management service 105 may use the markup recognition service 132 to analyze each of the mark-ups identified in order to determine meanings for the mark-ups. The markup recognition service 132 may be configured to identify objects within the various electronic document formats that represent inserted comments and tracked changes. For example, a Microsoft Word formatted electronic mark-up document may contain a data objects that represents a comment and a data object that represents edited text as a tracked change.

In an embodiment, the markup recognition service 132 may be configured to identify in-line text changes that may contain comments or edits. In-line text changes may represent edits that are not specified within a data object that represents a comment or a tracked change. For example, the first user may have inserted in-line comments that have been formatted to include open brackets before the comment and closed brackets after the comment. The markup recognition service 132 may implement a machine learning model trained to recognize in-line comments based upon special characters used to mark the comments. In another embodiment, the markup recognition service 132 may be configured to identify unmarked edits by comparing the content from the electronic mark-up document to the content of the original electronic document. Content that has been changed, such as added text or deleted text may be marked as a content suggestion.

At decision diamond 406, the document management system 100 may determine whether there are remaining mark-ups to analyze for generating annotations. In an embodiment, the document management service 105 may be configured to iteratively analyze each of the identified mark-ups. If the document management service 105 determines that there are remaining mark-ups to analyze, then the document management service 105 may proceed to block 408. If however, there are no remaining mark-ups to analyze then the document management service 105 may proceed to block 412.

At block 408, the document management system 100 identifies a document portion, from the original electronic document, that corresponds to a particular mark-up. In an embodiment, the document management system 100 may implement one or more machine learning models to identify a document type for the original electronic document, identify specific document portions within the original electronic document that correspond to sections, phrases, specific keywords, and any other content specific portion, and determine a correlation between the particular mark-up and a specific document portion of the original electronic document.

In an embodiment, the content recognition service 131 may analyze the original electronic document from the document to determine a document type. Document types may have specific terms, phrases, formatting that may be used to help determine how a particular mark-up is interpreted and correlates with a portion of the document. In an embodiment, the content recognition service 131 may implement machine learning model configured to determine a document type of an electronic document and specific document portions of the original electronic document. The machine learning model may receive, as input, the original content from the original electronic document and may output a document type for the electronic document and the identified document portions from the original content.

Upon determining the document portions within the original electronic document, the document management system 100 may determine a correlation between the particular mark-up and a document portion. In an embodiment, the content correlation service 134 may identify a match between the electronic mark-up and a document portion of the original electronic document.

At block 410, the document management system 100 may generate an annotation for the particular mark-up that comprises the mark-up and the first user ID for the user who generated the mark-up. The annotation may be represented as a visible comment, such as a comment bubble containing the text transcription of the mark-up, or a suggested edit that may be represented as a tracked change with a change bubble describing the suggested change. For example, if the mark-up type is determined to be a comment, then the annotation may be represented as a visible comment. If however, the mark-up is a suggested edit, then the annotation may be represented as a tracked change and/or a suggested edit within a comment bubble based on the confidence score determined by the markup recognition service 132.

Figure 5:
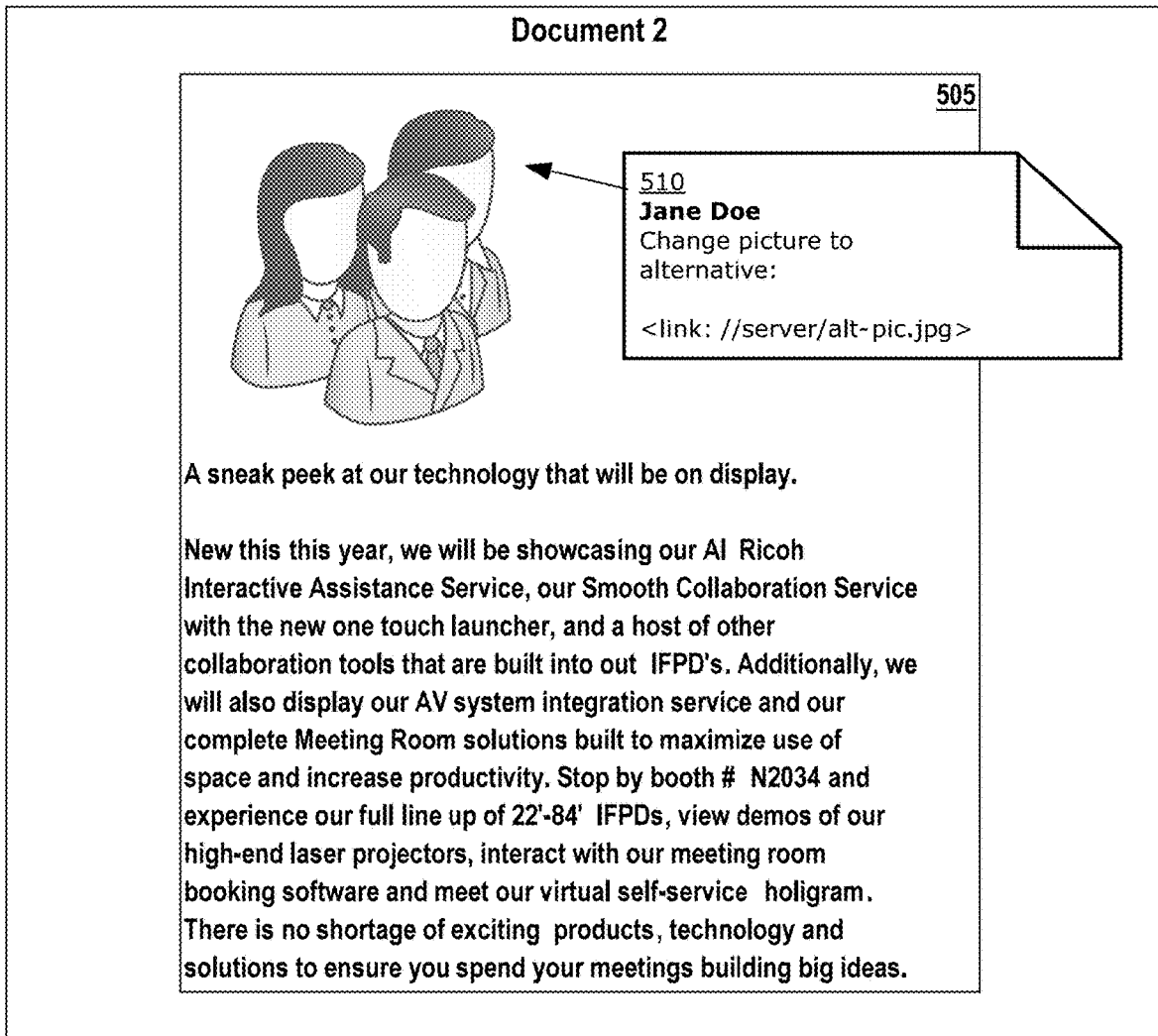
FIG. 5 depicts an example embodiment of an electronic document displayed with annotations representing identified mark-ups.

FIG. 5 depicts an example embodiment of an electronic document displayed with annotations representing identified mark-ups. Document 505 may represent an electronic document reviewed during the document review meeting. Annotation 510 may represent a comment type annotation that corresponds to the document portion corresponding to an image within document 505. Annotation 510 may include text stating "Change the picture to the alternative" and may include a link to the alternative picture that was provided within the electronic comment from the electronic mark-up document. Annotation 510 displays the first user ID as "Jane Doe."

Upon generating the annotation, the document management system 100 may proceed back to decision diamond 406. At decision diamond 406, the document management system 100 may determine whether there are remaining mark-ups to analyze to generate annotations. If there are remaining mark-ups to analyze, then the document management system 100 may proceed to blocks 408 and 410 to identify the document portion that corresponds to the current mark-up and generate an annotation for the current mark-up.

In an embodiment, blocks 402-410 may be repeated for each electronic document received by the content receiving service 110. For example, after a document review meeting, multiple reviewers may submit their suggested mark-ups, in electronic document form, to the content receiving service 110. The document management service 105 may manage each of the received electronic documents by iteratively processing each of the electronic documents as they are received.

If at decision diamond 406, all of the identified mark-ups have been analyzed, then the document management system 100 may proceed to block 412 to display, in electronic form within the display window, the original electronic document with the generated annotations. In an embodiment, the document management service 105 may communicate with the document presentation service 150 to generate a graphical user interface for displaying the original content with the one or more generated annotations within the display window on a client computing device. The graphical user interface may include, but is not limited to, displaying the original content of the electronic document, the generated annotations associated with document portions for the specific document displayed, and applied suggested edits associated with the annotations overlaid onto the display of the original content of the specific document. In an embodiment, the document management service 105 may store a copy of each of the one or more documents reviewed within the data repository 170.

C. Processing Media Content Items Containing Suggestions

Many professional and academic institutions may conduct document review meetings to discuss and suggest changes to one or more documents. A document review meeting may include formal meetings between reviewers, ad hoc meetings between reviewers, telephonic and video conferences between reviewers. For example, if reviewer Jane Doe initiated a phone call with John Smith to discuss document A, then the phone call may be considered a document review meeting. During a document review meeting, reviewers may orally discuss changes or suggestions for changes to documents. Reviewers may also make notes on whiteboards, chalkboards, interactive projectors, and other interactive devices. Document suggestions, whether made orally or written on a whiteboard or other device may be preserved by capturing the suggestions as a media content item. Media content items may refer to various different types of media content including, but not limited to recorded audio of a document review meeting, recorded video of a document review meeting, photographs of notes from a document review meeting, and captured screenshots from a projector, an Interactive Whiteboard Appliance (IWB), or any other media device.

An IWB may be configured to capture user input on the IWB display in the form of a series of stylus pen inputs. For example, when a stylus pen is used to generate marks on the IWB display, the IWB may generate a series of data objects, where each object includes a timestamp and (x, y) coordinates corresponding to a position on the IWB display where the IWB detected the stylus pen. The series of data objects may correspond to the path of the stylus pen stroke. In another example, the path of the stylus pen stroke may be represented by Bezier curve points. A Bezier curve refers to a parametric curve used in computer graphics to model a path. In an embodiment, the series of data objects corresponding to generated marks may be packaged into a media content item that may also include a screenshot of the IWB display along with coordinates for the screenshot. For example, a media content item representing captured content from an IWB may include a screenshot of the IWB display with corresponding coordinates for pixels within the screenshot and a series of data objects corresponding to generated marks from an input device, such as a stylus pen.

In an embodiment, the document management system 100 may be used to assist in capturing suggestions in document review meeting by receiving media content items that contain content suggestions for one or more documents under review. For example, a document review meeting may be recorded, either using an audio recorder or a video recorder. The recording may represent a media content item for the review meeting, which may be received by the document management system 100. The document management system 100 may then analyze the received media content item and determine one or more content suggestions for a document under review. The one or more content suggestions may be used to generate annotations and associate the generated annotations to document portions within the document under review.

Figure 6:
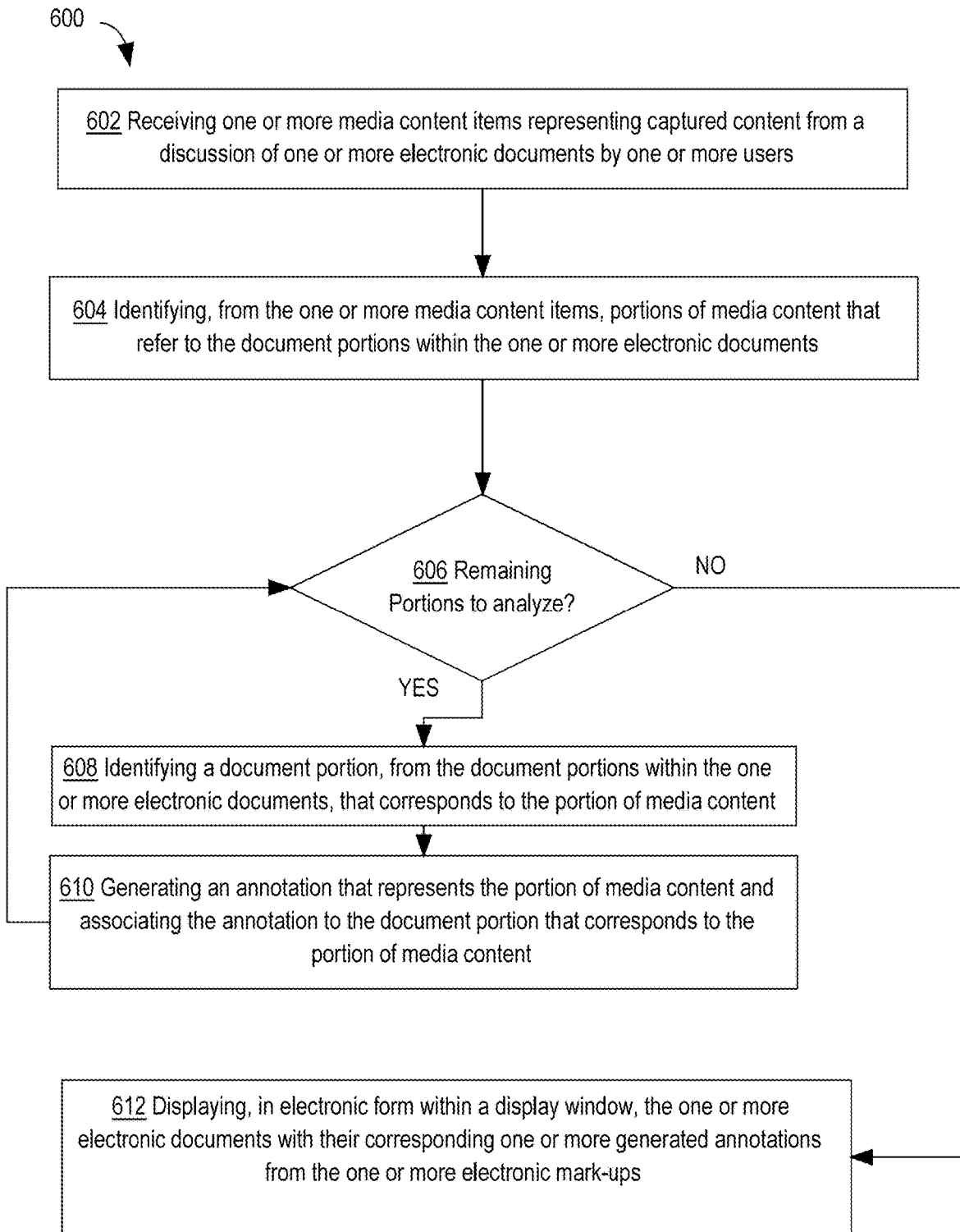
FIG. 6 is a flow diagram that depicts an approach for generating annotations based on suggested changes from media content items and generating updated electronic documents that include the corresponding suggested changes.

FIG. 6 is a flow diagram that depicts an approach for generating annotations based on suggested changes from media content items and generating updated electronic documents that include the corresponding suggested changes. Process 600 may be performed by a single program or multiple programs. The operations of the process as shown in FIG. 6 may be implemented using processor-executable instructions that are stored in computer memory. For purposes of providing a clear example, the operations of FIG. 6 are described as performed by services of the document management system 100. For the purposes of clarity, process 600 is described in terms of a single entity.

At block 602, the document management system 100 may receive one or more media content items representing captured content from a discussion of one or more electronic documents by one or more users. In an embodiment, the content receiving service 110 may receive media content items that include captured content from a document review meeting of one or more documents. For example, media content items may include recorded audio, video, and captured screenshots from the document review meeting. Captured screenshots may represent digital images captured by a digital camera or digital images files such as Portable Document Files (PDFs), Portable Network Graphics (PNG) files, JPEG files, or any other file that may contain an image of notes or mark-ups made during a document review meeting. For instance, reviewers may use an IWB appliance to make notes and other document mark-ups to a displayed document within the IWB display screen. The IWB may generate a PDF copy of the document under review including drawn notes made with a stylus onto the IWB. At the end of the meeting, the IWB may upload a generated PDF file to the content receiving service 110.

At block 604, the document management system 100 may identify, from the one or more media content items, portions of media content that refer to the document portions within the one or more documents. Portions of media content may refer to a subset of a media content item, such as an audio clip, video clip, a crop of an image, or any other subset of a media content item. In an embodiment, the document management system 100 may use the speech recognition service 133 to analyze each of the media content items to identify a portion of media content that refers to a document portion within the reviewed documents. For example, the speech recognition service 133 may identify audio clips of users talking about edits to specific words, phrases, sections of a reviewed document.

In an embodiment, the speech recognition service 133 may implement a machine learning model configured to identify portions of media content that indicate content suggestions for either comments or suggested edits. The machine learning model may receive as input a media content item that contains audio. The machine learning model may analyze speech detected in the media content item and translate the speech into text. The text may then be analyzed for specific words or phrases that may indicate suggested edits to the reviewed documents. For example, statements such as "the word . . . is duplicated," "we need more examples," "the introduction is too short," "the word . . . is misspelled," and "could you update figure X," may indicate that a specific portion of the media content relates to a suggestion or edit for a document. The machine learning model may then assign a content suggestion type, such as a comment or a suggested edit, based on the translated text of the speech. The machine learning model may also identify statements that may indicate a position within a document, such as "on the second page," "the final paragraph," "the sentence starting with," and so on. The output of the machine learning model may include a set of portions of media content identified as potential suggested edits for the documents reviewed.

In an embodiment, the machine learning model may also be configured to analyze the speech to determine the identity of a speaker. The machine learning model may be trained using speech clips of employees to determine the identity of the speaker. For example, the machine learning model may analyze frequency, pitch, and other audio qualities of the speech to determine if the audio clip of speech matches audio qualities for known employees or other participants.

In an embodiment, if the received media content items include media content that is a video, screenshot, or an image file that contains an image of mark-ups, then the document management system 100 may use the markup recognition service 132 to identify marks that correspond to a suggested edit. The markup recognition service 132 may analyze marks, such as handwritten marks, in order to determine a meaning of the mark. As described, the markup recognition service 132 may implemented a machine learning model to determine marks, and the meaning of the marks from the media content items. In the example of a video, the document management system 100 may use both the markup recognition service 132 and the speech recognition service 133 to identify suggested edits from marks captured by video and portions of media content captured by the audio of the video.

Referring to FIG. 6, at decision diamond 606 the document management system 100 may determine whether there are portions of media content to be analyzed. If there are portions of media content that are to be analyzed to generate an annotation, then the document management system 100 may select a portion of media content from the portions of media content and proceed to block 608. If however, there are no additional portions of media content to be analyzed, then the document management system 100 may proceed to block 612 to generate one or more updated electronic documents that include the generated annotations.

At block 608, the document management system 100 may identify a document portion, from the document portions of the one or more electronic documents, that corresponds to the portion of media content. In an embodiment, the document management system 100 may implement one or more machine learning models to identify document types for each of the one or more documents, identify specific document portions within the one or more documents that correspond to sections, phrases, specific keywords, and any other content-specific portion, and determine a correlation between the portion of media content and a document portion.

In an embodiment, the document management service 105 may determine which documents were under review based on document file names selected by a user, such as the document review meeting coordinator, or by analyzing the received media content items to identify the filenames of the reviewed documents. In an embodiment, the content recognition service 131 may analyze content of the one or more documents reviewed to determine document types and document portions for each reviewed document. The content recognition service 131 may implement a machine learning model configured to determine document types of each document using the contents of the documents as input. The machine learning model may be configured to identify document portions from a document that may correlate to content suggestions from media content items to locations within the document.

In an embodiment, the document management service 105 may send the portion of media content and the document portions identified from the one or more electronic documents to the content correlation service 134 in order to determine a correlation between a document portion and the portion of media content. The portion of media content sent to the content correlation service 134 may be in the form of a data object that includes translated text from the speech recognition service 133 and the portion of media content in its original form. The document portions may include additional property data, such as metadata, that describes the electronic document associated with each document portion, the document type associated with the electronic document, and any other document specific information that may be used to assist in finding a match between the portion of media content and the document portions.

In an embodiment, the content correlation service 134 may use a machine learning model configured to determine matches between the translated text and the document portions. For example, if the translated text of the portion of media content includes "Please reword the first sentence of the abstract," then the machine learning model may determine whether there is a matching document portion that corresponds to a first sentence of an abstract section of an electronic document. The machine learning model may identify keywords within the portion of media content, such as "abstract," and determine that the abstract keyword refers to a section within a patent application document type. The machine learning model may then use the abstract keyword to filter document portions based on matching document type. Additionally, if multiple document types have abstract sections, then the machine learning model may analyze each document portion that is associated with a matching document type. The content correlation service 134 may send to the document management service 105 a reference to the portion of media content and a matching document portion. The corresponding document portion may be a reference to the document portion and/or a positional location within the electronic document corresponding to the matching document portion.

At block 610, the document management system 100 may generate an annotation that represents the portion of media content and associate the annotation to the document portion that corresponds to the portion of media content. In an embodiment, the annotation generation service 120 may generate an annotation for the portion of media content that includes any of the following: the text transcription of the portion of media content, a confidence score that is associated with the text transcription, an annotation type specifying the whether the annotation is a comment or a suggested edit, and a link to the portion of media content. The annotation type may be based upon the suggestion type determined for the portion of media content. For example, if the suggestion type is a comment, then the generated annotation may be a comment bubble. If however, the suggestion type is a suggested edit, then the annotation may be displayed as suggested edit.

Figure 7:
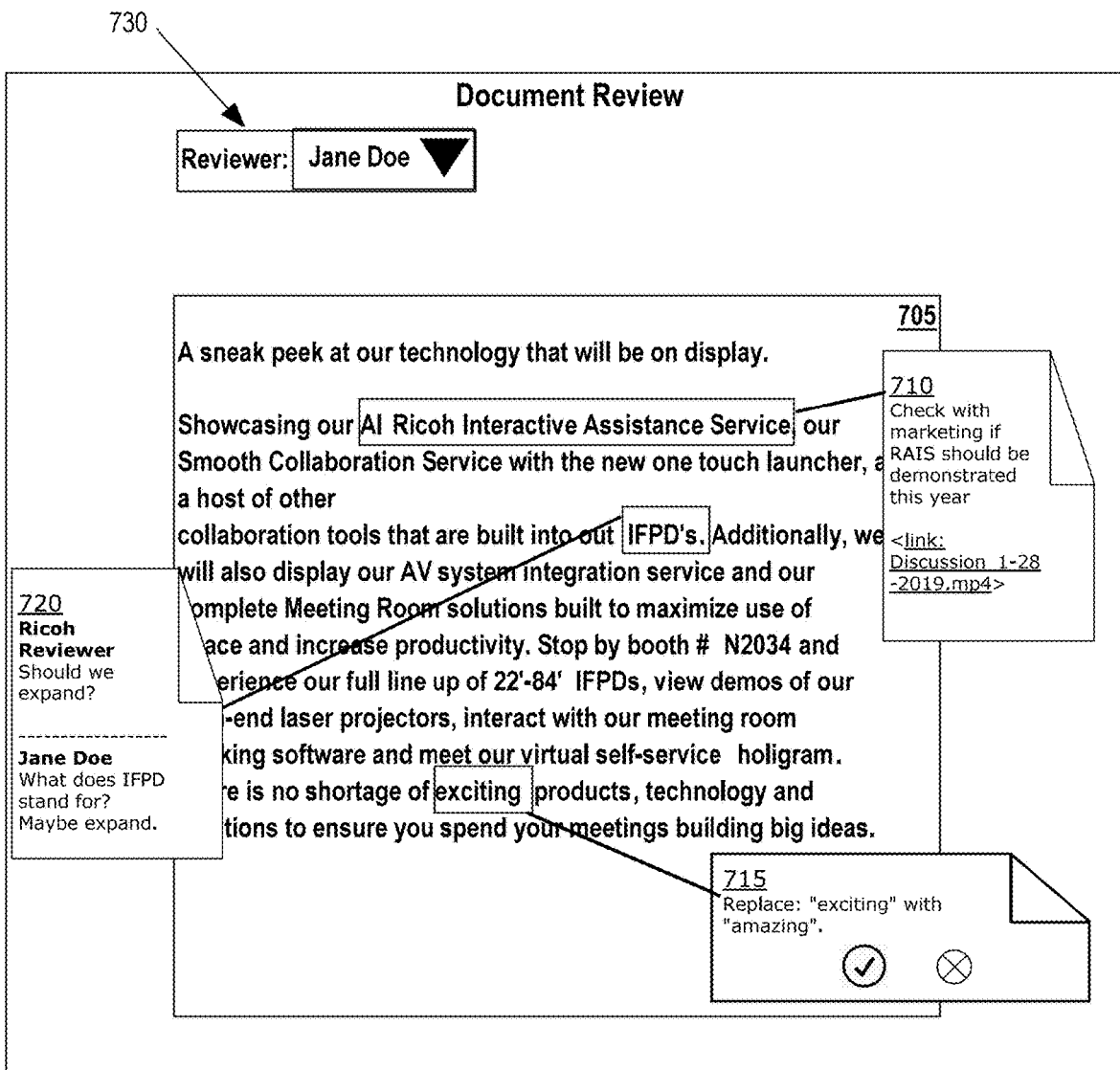
FIG. 7 depicts an example embodiment of an electronic document displayed with annotations representing identified portions of media content.

FIG. 7 depicts an example embodiment of an electronic document displayed with annotations representing identified portions of media content. Document 705 may represent a document reviewed during the document review meeting. Annotation 710 may represent a comment type annotation that corresponds to the document portion "AI Ricoh Interactive Assistance Service" within document 705. Annotation 710 may include the text transcription of "Check with marketing if RAIS should be demonstrated this year" and a link to the media content item that contains the portion of media content referring to the text transcription. In an embodiment, the link to the media content item, when selected by a user, may cause initiation of a media player program that is queued to the location of the portion of media content. For example, of a user selected the link in annotation 710, a media player program may open and may be queued to the portion of media content.

Annotation 715 represents a suggested edit annotation for replacing the word "exciting" with the word "amazing." The text transcription may display "Replace: "exciting" with "amazing." If the associated confidence score is above a specific confidence score threshold, then the suggested edit for annotation 715 may be applied to the document portion within document 705, as depicted in FIG. 7.

In an embodiment, the annotation generation service 120 may update an annotation with meeting specific information that may be used to identify when the suggestion was made and/or discussed. For instance, the annotation generation service 120 may update the annotation to include document review meeting details, such as meeting name, meeting date and time, meeting place, and meeting attendees. Each of the meeting properties may be used to filter annotations that may be displayed within the graphical display of the document.

In an embodiment, the speech recognition service 133, when analyzing media content items, may associate a specific user to an identified portion of media content if the user's voice is identified by the speech recognition service 133. User identification may be based on historical and/or training media content items used to train the machine learning model within the speech recognition service 133. If the speech recognition service 133 associates a particular user to speech in a portion of media content, then the annotation generation service 120 may update a generated annotation to include the user ID of the user is identified as the speaker. If however, a user is not identified, then the annotation generation service 120 may update the generated annotation to include a global user ID, company ID, or department ID for the specific company and/or department that conducted the document review meeting.

In an embodiment, a user, such as the document owner or a document reviewer, when reviewing the annotations may update annotation properties to assign a user ID to an annotation that is based on a portion of media content. For example, user Jane Doe may update annotation 710 to assign the user ID for James Smith to annotation 710 if James Smith is the user who made the suggestion during the meeting. In another embodiment, if multiple users were engaged in the discussion related to annotation 710, then user Jane Doe may update annotation 710 to include each of the users involved in the discussion.

Upon generating the annotation, the document management system 100 may proceed to decision diamond 606 to determine whether there are additional portions of media content that need to be analyzed. If there are additional portions of media content to be analyzed, the document management system 100 may repeat blocks 608 and 610 to generate annotations for each of the portions of media content. If at decision diamond 606 there are no additional portions of media content to be analyzed, the document management system 100 may proceed to block 612.

At block 612, the document management system 100 may display, in electronic form within a display window, the one or more documents with the generated annotations. In an embodiment, the document management service 105 may communicate with the document presentation service 150 to generate a graphical user interface for displaying the original content with the one or more generated annotations within the display window on a client computing device. The graphical user interface may include, but is not limited to, displaying the original content of a document, the generated annotations associated with document portions for the specific document displayed, and applied suggested edits associated with the annotations overlaid onto the display of the original content of the specific document.

In an embodiment, the document management service 105 may store a copy of each of the one or more documents reviewed within the data repository 170. Stored copies of the documents may include each of the generated annotations associated with each corresponding document.

D. Updating Annotations with Additional Suggestions

In an embodiment, the document management system 100 may receive suggestions from media content items, electronic documents, and physical documents that contain mark-ups that refer to document portions of the original content that already have existing annotations. For example, a particular document portion may represent the first sentence of an introduction section and the document management system 100 may have previously associated an annotation containing a comment to the particular document portion. The document management system 100 may then receive a media content item that contains another suggested comment for the same document portion referencing the first sentence in the introduction section. The document management system 100 may determine whether the comment from the media content item is related to the existing annotation and if so, the document management system 100 may update the annotation to include the comment from the media content item.

As described with FIG. 4, the document management system 100 may receive generate annotations based on suggestions received from one or more marked-up electronic documents. The document management system 100 may analyze the one or more marked-up electronic documents and generate annotations for each of the suggested mark-ups in the one or more marked-up electronic documents. The document management system 100 may store the generated annotations, as part of an updated electronic document, in the data repository 170. In an embodiment, the generated annotations may also be stored as separate annotation objects within the data repository 170.

Figure 8:
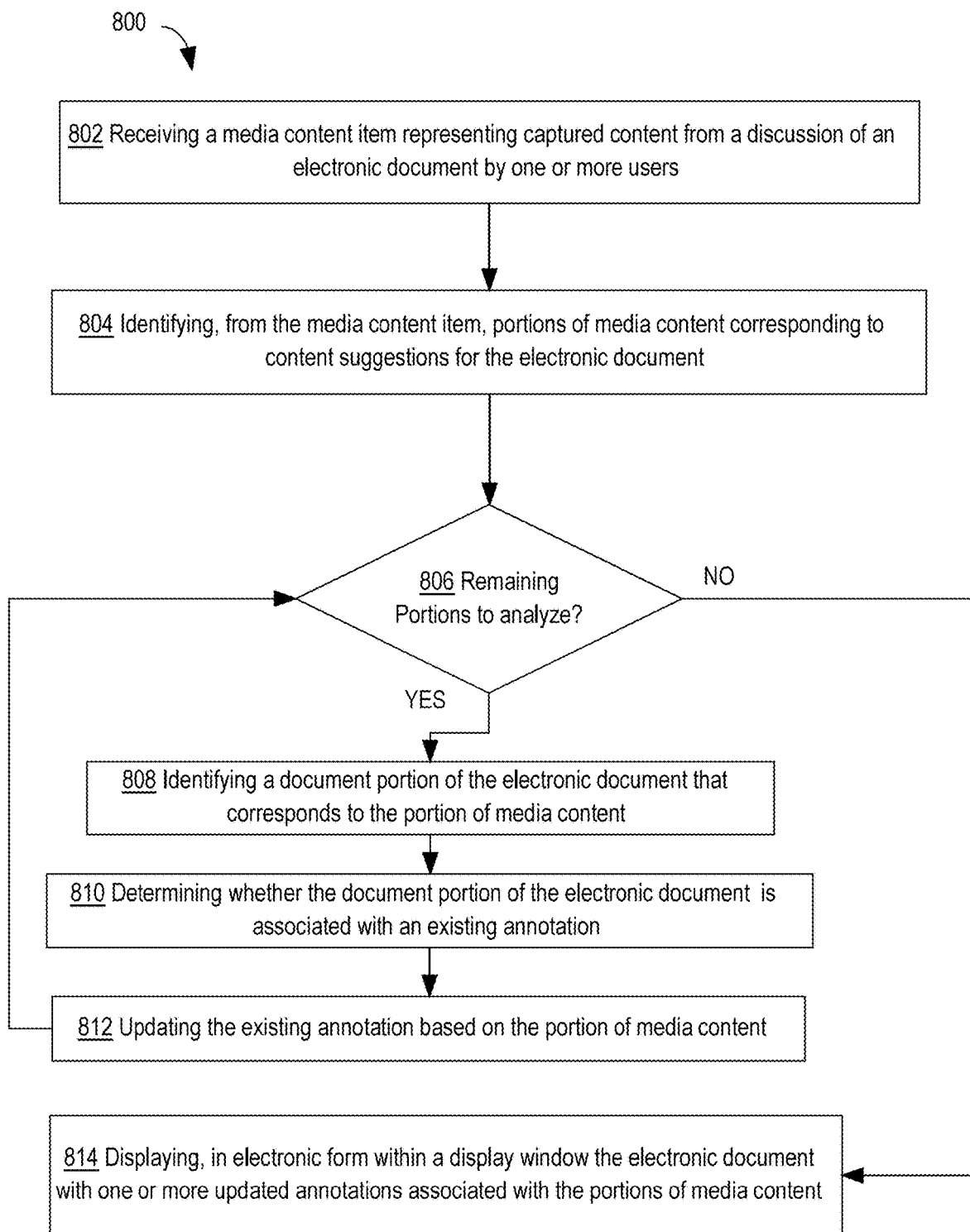
FIG. 8 depicts a flow diagram of an approach for updating existing annotations based on suggested changes from media content items and generating updated electronic documents that include the corresponding suggested changes.

FIG. 8 depicts a flow diagram of an approach for updating existing annotations based on suggested changes from media content items and generating updated electronic documents that include the corresponding suggested changes. Process 800 may be performed by a single program or multiple programs. The operations of the process as shown in FIG. 8 may be implemented using processor-executable instructions that are stored in computer memory. For purposes of providing a clear example, the operations of FIG. 8 are described as performed by services of the document management system 100. For the purposes of clarity, process 800 is described in terms of a single entity.

At block 802, the document management system 100 may receive a media content item representing captured content from a discussion of an electronic document by one or more users. In an embodiment, the content receiving service 110 may receive the media content item representing recordings of a document review meeting of the electronic document. Examples of the media content item include recorded audio, video, and captured screenshots from the document review meeting. The content receiving service 110 may receive the media content item from a direct upload to a specified web site, from an email that was sent to a specific email account associated with the document management system 100, or from a network location associated with a network storage service, such as Box, Google Drive, Drop Box, or any other network storage service.

In another embodiment, the content receiving service 110 may receive files, other than media content items, that include suggested changes for the electronic document. For example, the content receiving service 110 may receive additional marked-up electronic documents, scanned versions of marked-up physical documents, and any other type of file that may contain mark-ups corresponding to suggested changes to the electronic document.

At block 804, the document management system 100 may identify, from the received media content item, portions of media content corresponding to content suggestions for the electronic document. Portions of media content may refer to a subset of a media content item, such as an audio clip, video clip, a crop of an image, or any other subset of a media content item. In an embodiment, the document management system 100 may use the speech recognition service 133 to analyze each of the media content items to identify portions of media content that refer to document portions of the reviewed document. For example, the speech recognition service 133 may identify audio clips of users talking about edits specific words, phrases, sections of a reviewed document.

In an embodiment, the speech recognition service 133 may implement a machine learning model configured to identify portions of media content that indicate suggested changes for the electronic document. The machine learning model may receive as input a media content item that contains audio. The machine learning model may analyze speech detected in the media content item and translate the speech into text. The text may then be analyzed for specific words or phrases that may indicate content suggestions for the reviewed document. The machine learning model may also identify statements that may indicate a position within a document, such as "on the second page," "the final paragraph," "the sentence starting with," and so on. The output of the machine learning model may include a set of portions of media content identified as potential suggested edits for the document reviewed.

In an embodiment, the machine learning model implemented by the speech recognition service 133 may be configured to assign a confidence score to text transcriptions of the set of portions of media content identified, where the confidence score represents an accuracy value for the translation. Determining the confidence score may be based on the clarity of the speech within the portions of media content and how well the machine learning model is able to match translated words and phrases to the spoken speech in the portions of media content.

In an embodiment, if the received media content items include media content that is a video, screenshot, or an image file that contains an image of mark-ups, then the document management system 100 may use the markup recognition service 132 to identify marks that correspond to a suggested edit. The markup recognition service 132 may analyze marks, such as handwritten marks, in order to determine a meaning of the mark. As described, the markup recognition service 132 may implemented a machine learning model to determine marks, and the meaning of the marks from the media content items. In the example of a video, the document management system 100 may use both the markup recognition service 132 and the speech recognition service 133 to identify suggested edits from marks captured by video and portions of media content captured by the audio of the video. In another embodiment, if the received files include marked-up electronic documents or marked-up physical documents, then the document management system 100 may use the markup recognition service 132 to identify marks that correspond to a suggested edit.

At decision diamond 806 the document management system 100 may determine whether there are portions of media content to be analyzed. If there are portions of media content that is to be analyzed to generate an annotation, then the document management system 100 may select a portion of media content from the portions of media content and proceed to block 808 to analyze the selected portion of media content. If however, there are no additional portions of media content to be analyzed, then the document management system 100 may proceed to block 814 to generate updated electronic documents that include the updated annotations.

At block 808, the document management system 100 may identify a document portion, from the document portions of the electronic document, that corresponds to the portion of media content. In an embodiment, the document management system 100 may implement one or more machine learning models to identify document types for the document, identify specific document portions within the document that correspond to sections, phrases, specific keywords, and any other content specific portion, and determine a correlation between the portion of media content and a document portion.

In an embodiment, similar to block 608 in FIG. 6, the document management system 100 may identify a document portion, from the document portions of the electronic documents, that corresponds to the portion of media content. In an embodiment, the document management system 100 may implement one or more machine learning models to identify document types for each of the one or more documents, identify specific document portions within the one or more documents that correspond to sections, phrases, specific keywords, and any other content-specific portion, and determine a correlation between the portion of media content and a document portion.

In an embodiment, the document management service 105 may send the portion of media content and the document portions identified from the electronic documents to the content correlation service 134 to determine a correlation between a document portion and the portion of media content. The content correlation service 134 may use a machine learning model configured to determine matches between the translated text and the document portions. The content correlation service 134 may send to the document management service 105 a reference to the portion of media content and a matching document portion. The corresponding document portion may be a reference to the document portion and/or a positional location within the electronic document corresponding to the matching document portion.

At block 810, the document management system 100 may determine that the document portion identified at block 808 is associated with an existing annotation. In an embodiment, the document management service 105 may access existing stored annotations from the data repository 170 in order to determine whether an existing annotation is associated with the identified document portion. For example, if the identified document portion corresponds to the term "AI Ricoh Interactive Assistance Service" in the first paragraph of document "exampleDoc.doc" then the document management service may access the existing stored annotations from the data repository 170 to determine whether an existing annotation for the "AI Ricoh Interactive Assistance Service" exists. If an existing annotation exists in the data repository 170, the document management service 105 may identify the annotation and proceed to block 812 to update the existing annotation.

In an embodiment, the document management service 105 may analyze the document portion associated with an existing annotation to determine whether the associated document portion of the existing annotation corresponds to the identified document portion of the portion of media content. As described, document portions may represent words, phrases, sentences, images, paragraphs, and sections. If a document portion associated with an existing annotation corresponds to a particular paragraph and the identified document portion for the portion of media content corresponds to a word or phrase within the particular paragraph then the document management service 105 may determine that the two document portions represent separate portions of the document even though the document portions overlap. The document management service 105 may then send a request to the annotation generation service 120 to generate a separate annotation for the portion of media content corresponding. In an embodiment, the document management service 105 may be configured to determine whether the amount of overlap between two document portions exceeds a threshold to determine that the document portions correspond to the same portion. For instance, the threshold may be set at a 60% overlap, where the two document portions must overlap by 60% or more to be considered the same document portion. In the previous example, if the document portion associated with an existing annotation corresponds to an entire paragraph and the document portion associated with the portion of media content corresponds to a sentence within the paragraph and the sentence makes up less than 60% of the paragraph, then the document management service 105 may determine that the threshold has not been met and the existing annotation may not be considered as overlapping with the portion of media content. In an embodiment, the threshold value for determining document portion overlap may be configured to any overlap value between 0 and 100.

At block 812, the document management system 100 updates the existing annotation based on the portion of media content. In an embodiment, the document management service 105 may update the existing annotation based on the portion of media content. The update may include adding to the annotation object any of the following: the text transcription of the portion of media content, a confidence score that is associated with the text transcription, and a link to the portion of media content.

In an embodiment, the document management service 105 may determine whether the existing annotation type and the suggestion type determined for the portion of media content are the same. If the existing annotation type and the suggestion type of the portion of media content are the same, then the document management service 105 may send a request to the annotation generation service 120 to update the existing annotation. If however, the existing annotation type and the suggestion type of the portion of media content are not the same, then the document management service 105 may send a request to the annotation generation service 120 to generate a new annotation for the portion of media content. The document management service 105 may ensure that different suggestion types are represented by unique annotations in order to clearly identify the different types of suggestions.

In an embodiment, the document management service 105 may determine whether the user ID associated with existing annotation type is the same user ID that is associated with the portion of media content. If the user ID associated with existing annotation type is the same user ID that is associated with the portion of media content, then the document management service 105 may send a request to the annotation generation service 120 to update the existing annotation. If however, the user ID associated with existing annotation type is not the same user ID that is associated with the portion of media content, then the document management service 105 may send a request to the annotation generation service 120 to generate a new annotation for the portion of media content. The document management service 105 may request generation of unique annotations for each user ID for the purpose of clearly displaying each user's suggestions. Additionally, when displaying annotations within a display window, a user may filter annotations based on user ID, therefore having unique user IDs for each annotation may allow for filtering by user.

In another embodiment, if the user IDs between an existing annotation and the portion of media content are different, then the document management service 105 may request the annotation generation service 120 to update the existing annotation to include the portion of media content, but specify that the portion of media content is associated with a different user ID. Annotations that have content from multiple user IDs may be marked or indicated as such within the display window. Referring to FIG. 7, annotation 720 is an example annotation that contains content from multiple users. Annotation 720 is associated with the document portion corresponding to the term IFPD's. Annotation 720 contains two comments, the first comment is identified as "Ricoh Reviewer" which corresponds to a Ricoh employee who attended the document review meeting and was captured speaking by the media content item. The second comment is identified as "Jane Doe" and originates from a marked-up electronic document.

At block 814, the document management system 100 may display, in electronic form within a display window, the electronic document with the updated annotations, existing annotations, and newly generated annotations. In an embodiment, the document management service 105 may communicate with the document presentation service 150 to generate a graphical user interface for displaying the electronic document with the one or more updated and generated annotations within the display window on a client computing device. The graphical user interface may include, but is not limited to, displaying the original content of the electronic document, the associated annotations, and the mark-ups associated with the annotations overlaid onto the display of the original content.

Referring to FIG. 7, reviewer drop-down list 730 may represent a drop-down list of available reviewers that provided suggestions for the electronic document. If a particular reviewer, such as Jane Doe, is selected from the reviewer drop-down list 730, then the graphical user interface may display mark-ups and annotations associated with reviewer Jane Doe. In an embodiment, the document presentation service 150 may be configured to show specific annotations associated with multiple users when one of the multiple users is selected from the reviewer drop-down list 730. For instance, if reviewer Jane Doe is selected from the reviewer drop-down list 730, then the document presentation service 150 may display annotation 720 even though annotation 720 contains suggestions from Jane Doe and Ricoh Reviewer.

In another embodiment, the document presentation service 150 may be configured to only show the comments of an annotation from the specific user selected in the reviewer drop-down list 730. For example, when Jane Doe is selected from the reviewer drop-down list 730 the document presentation service 150 may display only the comments associated with Jane Doe which includes "What does IFPD stand for? Maybe expand?" In yet other embodiments, the document presentation service 150 may be configured to show the comments of an annotation from the specific user selected as well as public user comments. A public user comment may include comments associated with a generic user ID, such as "Ricoh Reviewer" or any other group user ID that is configured to be public.

E. Generating Third-Party Annotation Requests

Electronic documents under review may be managed by systems other than the document management system 100. For instance, an electronic document may be managed by an external document management system, such as G-Suite by Google or any other commercially available or privately managed document management system. The document management system 100 may be configured to identify content suggestions from a variety of inputs, determine the types of suggestions, and generate annotation generation requests that may be sent to the external document management system managing the electronic document under review.

Figure 9:
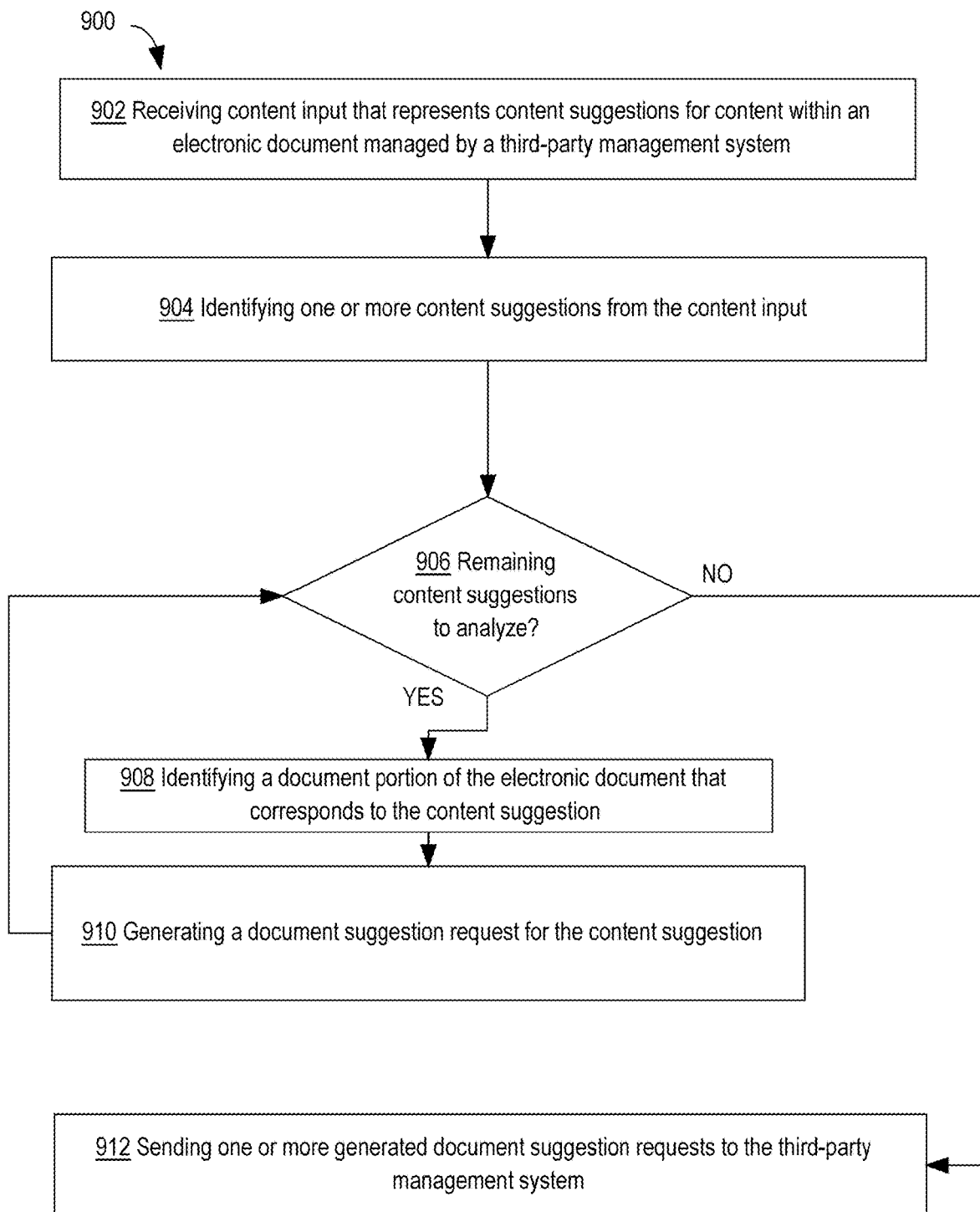
FIG. 9 is a flow diagram that depicts an approach for generating annotation requests based on suggestions received from content input.

FIG. 9 is a flow diagram that depicts an approach for generating annotation requests based on suggestions received from content input. Process 900 may be performed by a single program or multiple programs. The operations of the process as shown in FIG. 9 may be implemented using processor-executable instructions that are stored in computer memory. For purposes of providing a clear example, the operations of FIG. 9 are described as performed by services of the document management system 100. For the purposes of clarity, process 900 is described in terms of a single entity.

At block 902, the document management system 100 may receive content input that represents content suggested for content within an electronic document managed by a third-party management system. In an embodiment, the content receiving service 110 may receive the content input that includes suggestions for content within the electronic document. Content input may represent any type medium that include content suggestions for content within the electronic document including, but not limited to, a marked-up physical document, a marked-up electronic document, a media content item in the form of audio, video, or one or more screenshots, or any other file that contains the suggested changes to the content. The content receiving service 110 may receive the content input via direct upload to a specified website, a link to a network location associated with a network storage service, email, or any other way.

In an embodiment, the document management service 105 may determine the content of the electronic document from the received content input. For example, if the received content input is a marked-up electronic document, then the document management service 105 may determine the original content of the electronic document based upon text that does not include mark-ups, comments, or tracked changes. In another embodiment, the document management service 105 may determine the original content for the electronic document by communicating with the third-party document management system to retrieve an original version of the electronic document. For example, the document management service 105 may determine the name of the original electronic document from the filename given to the content input. In other examples, the document management service 105 may send a request for the original electronic document to the third-party document management system. The third-party document management system may respond with a copy of the original electronic document, or a link to download the original electronic document.

In examples where the content input represents a content media item, the document management service 105 may extract the name of the original electronic document from the captured content within the content input. For instance, if the content input is an audio file, the document management service 105 may analyze the audio content for spoken words that may represent the file name of the electronic document under review. The document management service 105 may then send a request for the original electronic document to the third-party document management system.

At block 904, the document management system 100 may identify one or more content suggestions that represent suggested changes to the electronic document. In an embodiment, if the content input is a marked-up electronic document, then the document management service 105 may identify the content suggestions as mark-ups in the marked-up electronic document by first identifying the original content within the electronic mark-up document by comparing the electronic mark-up document to the original content from the retrieved original electronic document. The document management service 105 may identify the mark-ups in the electronic markup document by identifying content that is separate from the original content identified.

In an embodiment, the document management service 105 may use the markup recognition service 132 to analyze each of the mark-ups identified in order to determine meanings for the mark-ups. The markup recognition service 132 may implement the machine-learning model to identify meanings for each of the mark-ups.

In an embodiment, if the content input is a media content item, then the document management service 105 may identify, from the content input, content suggestions refer to document portions within the electronic document. The content suggestions may represent portions of media content, such as audio clips, video clips, or crops of screenshots that refer to portions of the electronic document. In an embodiment, the document management service 105 may use the speech recognition service 133 to analyze the content input to the content suggestions that refer to document portions of the reviewed documents. The speech recognition service 133 may implement a machine learning model configured to identify the content suggestions that indicate suggested changes for the electronic documents.

In an embodiment, the document management service 105 may determine a suggestion type from the meaning of the content suggestion identified. For example, if the content input is a marked-up electronic document then the document management service 105 may use the markup recognition service 132 to determine a suggestion type based upon the meaning of the identified mark-up. In another example, if the content input is a media content item, then the document management service 105 may use the speech recognition service 133 to determine translated text for the content suggestion and determine a suggestion type based upon the meaning of the translated text.

In an embodiment, the document management service 105 may determine a user ID for a user that is associated with an identified content suggestion. For instance, if the content input is a marked-up electronic document. Then the document management service 105 may determine a user from metadata associated with the marked-up electronic document, such as author properties for the electronic document or a username associated with a particular comment embedded in the marked-up electronic document. If the content input is media content item, then the document management service 105 may use the speech recognition service 133 to determine a user associated with speech corresponding to a particular content suggestion.

Upon identifying the one or more content suggestions, the document management system 100 may iteratively analyze each content suggestion in order to determine a corresponding document portion from the original content of the electronic document. At decision diamond 906, the document management system 100 may determine whether there are remaining content suggestions for analysis. If there is a remaining content suggestion that is to be analyzed, then the document management system 100 may select a content suggestion and proceed to block 908 to analyze the selected content suggestions. If however, there are no additional content suggestions to be analyzed, then the document management system 100 may proceed to block 912 to send one or more generated document suggestion requests to the third-party management system.

At block 908, the document management system 100 may identify a document portion, from the document portions of the electronic document, that corresponds to the selected content suggestion. In an embodiment, the document management system 100 may implement one or more machine learning models to identify a document type for the electronic document, identify specific document portions within the electronic document that correspond to sections, phrases, specific keywords, and any other content specific portion, and determine a correlation between the portion of media content and a document portion.

Upon determining the document portions within the original electronic document, the document management system 100 may determine a correlation between the selected content suggestion and a document portion. In an embodiment, the content correlation service 134 may identify a match between the selected content suggestion and a document portion of the document portions identified from the electronic document.

At block 910, the document management system 100 may generate a document suggestion request for the selected content suggestion. In an embodiment, the annotation generation service 120 may generate a third-party compatible document suggestion request that includes a text transcription of the content suggestion, the type of suggestion, a user ID determined from the content suggestion, an electronic document location corresponding to the document portion of the electronic document, and an electronic link to the content input. For example, if the selected content suggestion is an audio clip from a media content item of comments directed to a product described in the electronic document, then the document suggestion request generated may include a text transcription of the audio clip, a suggestion type, such as a comment, determined from the translated audio clip, a user ID identifying the user who made the suggestion, a document location corresponding to the document portion of the product described, and an electronic link to the media content item queued to the specific audio clip.

Upon generating the document suggestion request, the document management system 100 may proceed to decision diamond 906. At decision diamond 906 the document management system 100 may determine whether there are remaining content suggestions to be analyzed. IF there are remaining content suggestions to be analyzed, the document management system 100 may repeat blocks 908 and 910 until all content suggestions have been analyzed. If there are no remaining content suggestions to be analyzed, then the document management system 100 may proceed to block 912.

At block 912, the document management system 100 may send the generated document suggestion requests to the third-party management system. In an embodiment, the document management service 105 may send, via network 160, the generated document suggestion requests to the third-party management system. In an embodiment, if the content input is a media content item, then the document management service 105 may send, along with the document suggestion requests the content input corresponding to the document suggestion requests. For instance, if the document suggestion request corresponds to an audio clip from a media content item, then the document management service 105 may send the media content item with metadata queuing the media content item to the corresponding audio clip. The third-party management system may receive the document suggestion requests, along with corresponding media content items, and generate annotations that are specific to the third-party management system. For example, if the third-party management system is Google G-Suite, then Google G-Suite may generate a comment for a received document suggestion request. If the document suggestion request includes a media content item reference, then the corresponding media content item may be stored within Google G-Suite and the generated comment may have an electronic link to the stored media content item, such that a user reviewing the electronic document may select the electronic link and listen to the corresponding audio clip.

F. Generating a Meeting Summary Document

Many professional and academic institutions may conduct document review meetings to discuss and suggest changes to one or more documents. A document review meeting may include formal meetings between reviewers, ad hoc meetings between reviewers, and telephonic or video conferences between reviewers. During document review meetings many different topics, which may cover content from multiple different documents, may be discussed. Summary meetings documents may describe the different discussion topics covered during the document review meeting. For example, one such discussion topic may be reviewing figures related to multiple documents. It is advantageous to gather notes for each discussion topic even when the discussion topic spans multiple documents. However, relying on a single or multiple notetakers has its disadvantages as a notetaker may miss some details of discussions.

In an embodiment, the document management system 100 may be configured to receive one or more media content items of captured discussions during the document review meeting. The document management system 100 may analyze each of the media content items and generate a meeting summary document that includes discussion topics from the document review meeting.

Figure 10:
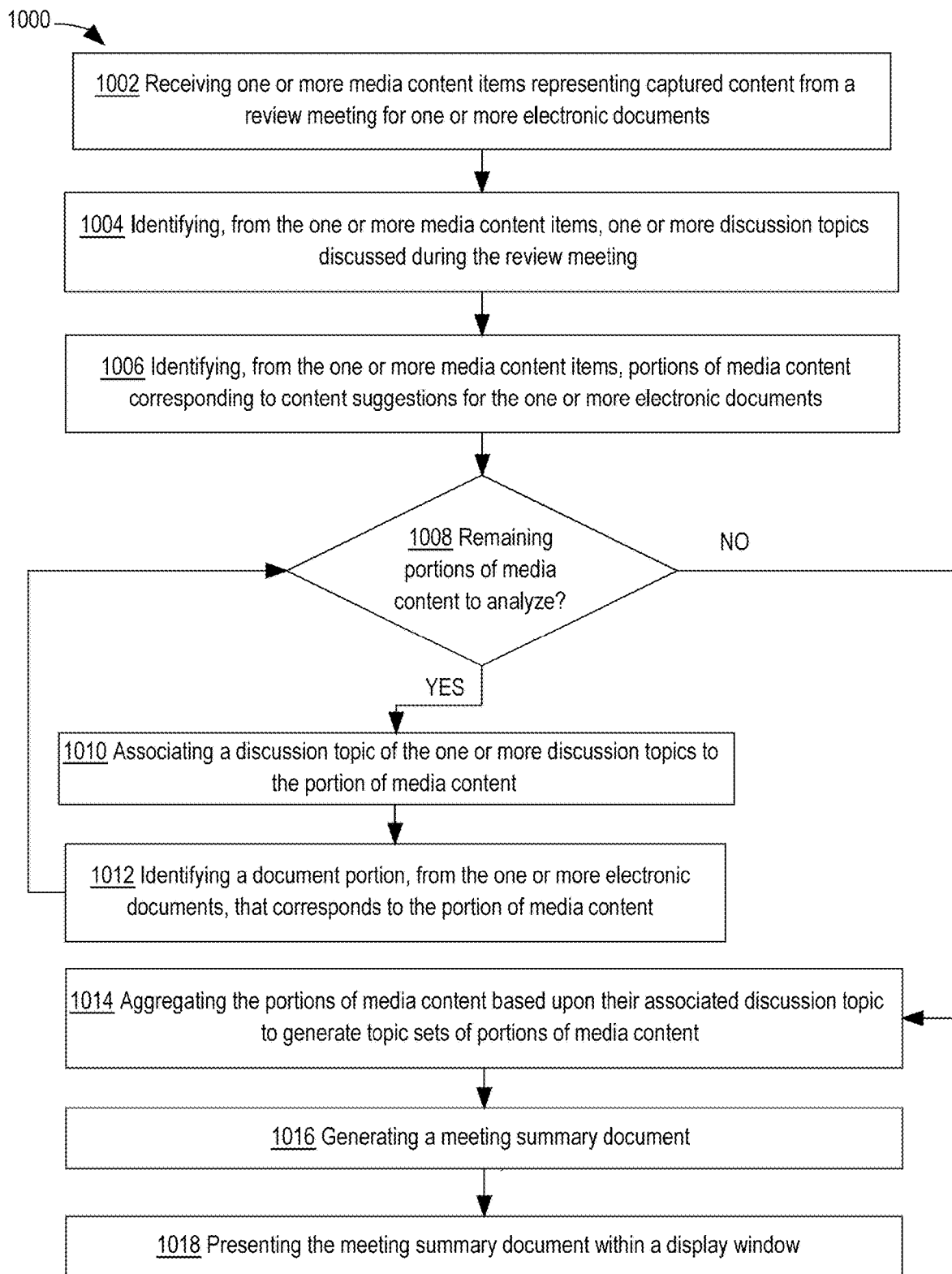
FIG. 10 is a flow diagram that depicts an approach for generating a meeting summary document based media content items of captured discussions during a document review meeting.

FIG. 10 is a flow diagram that depicts an approach for generating a meeting summary document based media content items of captured discussions during a document review meeting. Process 1000 may be performed by a single program or multiple programs. The operations of the process as shown in FIG. 10 may be implemented using processor-executable instructions that are stored in computer memory. For purposes of providing a clear example, the operations of FIG. 10 are described as performed by services of the document management system 100. For the purposes of clarity, process 1000 is described in terms of a single entity.

At block 1002, the document management system 100 may receive one or more media content items representing captured content from a review meeting for one or more electronic documents. In an embodiment, the content receiving service 110 may receive media content items that include recorded audio, video, and captured screenshots of a document review meeting of one or more documents.

At block 1004, the document management system 100 may identify, from the one or more media content items, one or more discussion topics discussed during the review meeting. Discussion topics may refer to keywords or phrases that describe products, events, milestones, places, persons, or any other subject matter related to the reviewed documents that may be discussed during the review meeting. In an embodiment, the document management service 105 may use the speech recognition service 133 to analyze each of the media content items to identify specific keywords and phrases that may represent discussion topics. The speech recognition service 133 may implement one or more machine learning models to identify the discussion topics by analyzing the media content items. The machine learning models may be trained using input data sets that include keywords and phrases directed towards identified discussion topics.

In another embodiment, a user, such as a meeting coordinator, may provide the document management service 105 a set of discussion topics discussed during the review meeting. For example, a meeting coordinator may, before or after the review meeting, provide a list of planned discussion topics for the review meeting. In another embodiment, the document management service 105 may receive, from a user, a list of proposed discussion topics and may provide the list of proposed discussion topics to the speech recognition service 133, along with the media content items. The speech recognition service 133 may be configured to use the list of proposed discussion topics as a guide and/or starting point for identifying discussion topics from the media content items.

In yet another embodiment, the document management service 105 may determine the one or more electronic documents that are the subject of the review meeting and may provide the one or more electronic documents to the content recognition service 131 to determine additional discussion topics. The content recognition service 131 may be configured to analyze the one or more electronic documents and determine potential discussion topics based upon the sections, paragraphs, keywords, and titles within the electronic documents.

At block 1006, the document management system 100 may identify, from the one or more media content items, portions of media content corresponding to content suggestions for the one or more electronic documents discussed during the review meeting. In an embodiment, the document management system 100 may use the speech recognition service 133 to analyze each of the media content items to identify a portion of media content that refers to a document portion within the reviewed documents. For example, the speech recognition service 133 may identify audio clips of users talking about edits to specific words, phrases, sections of a reviewed document.

In an embodiment, the speech recognition service 133 may implement a machine learning model configured to identify portions of media content that indicate content suggestions for either comments or suggested edits. The machine learning model may receive as input a media content item that contains audio. The machine learning model may analyze speech detected in the media content item and translate the speech into text. The text may then be analyzed for specific words or phrases that may indicate suggested edits to the reviewed documents. For example, statements such as "the word . . . is duplicated," "we need more examples," "the introduction is too short," "the word . . . is misspelled," and "could you update figure X," may indicate that a specific portion of the media content relates to a suggestion or edit for a document. The machine learning model may then assign a content suggestion type, such as a comment or a suggested edit, based on the translated text of the speech. The machine learning model may also identify statements that may indicate a position within a document, such as "on the second page," "the final paragraph," "the sentence starting with," and so on. The output of the machine learning model may include a set of portions of media content identified as potential content suggestions for the documents reviewed.

At decision diamond 1008, the document management system 100 may determine whether there are portions of media content to be analyzed. If there are portions of media content that are to be analyzed, then the document management system 100 may select a portion of media content from the portions of media content and proceed to block 1010. If however, there are no additional portions of media content to be analyzed, then the document management system 100 may proceed to block 1014.

At block 1010, the document management system 100 may associate a discussion topic of the one or more discussion topics to the portion of media content. In an embodiment, the document management service 105 may use the speech recognition service 133 to determine which discussion topic is associated with the selected portion of media content. The speech recognition service 133 may be configured to determine associations between identified discussion topics and the portion of media content by analyzing keywords within the discussion topics and the portion of media content. The speech recognition service 133 may implemented a machine learning model to determine the association between the portion of media content and the discussion topics. For example, the machine learning model may be trained to use certain keywords present in the portion of media content to determine associated discussion topics that may be related to the certain keywords. In another embodiment, the speech recognition service 133 may analyze timestamps associated with the discussion topics and the portion media content to determine if the portion of media content corresponds to a time during the review meeting that corresponds to a particular discussion topic. Upon determining one or more discussion topics associated with the portion of media content, the document management service 105 may store, within a data object of the portion of media content, property values identifying the associated discussion topics.

At block 1012, the document management system 100 may identify a document portion, from the one or more electronic documents, that corresponds to the portion of media content. In an embodiment, the document management system 100 may implement one or more machine learning models to identify document types for each of the one or more documents, identify specific document portions within the one or more documents that correspond to sections, phrases, specific keywords, and any other content-specific portion, and determine a correlation between the portion of media content and a document portion.

In an embodiment, the document management service 105 may determine which documents were under review based on document file names provided by a user, such as the document review meeting coordinator, by analyzing the received media content items to identify the filenames of the reviewed documents, or by receiving a list of reviewed documents from a user. In an embodiment, the content recognition service 131 may analyze content of the one or more documents reviewed to determine document types and document portions for each reviewed document. The content recognition service 131 may implement a machine learning model configured to determine document types of each document using the contents of the documents as input. The machine learning model may be configured to identify document portions from a document that may correlate to content suggestions from media content items to locations within the document.

In an embodiment, the document management service 105 may send the portion of media content and the document portions identified from the one or more electronic documents to the content correlation service 134 in order to determine a correlation between a document portion and the portion of media content. The portion of media content sent to the content correlation service 134 may be in the form of a data object that includes translated text from the speech recognition service 133 and the portion of media content in its original form. The document portions may include additional property data, such as metadata, that describes the electronic document associated with each document portion, the document type associated with the electronic document, and any other document specific information that may be used to assist in finding a match between the portion of media content and the document portions.

In an embodiment, the content correlation service 134 may use a machine learning model configured to determine matches between the translated text and the document portions. For example, if the translated text of the portion of media content includes "Please reword the first sentence of the abstract," then the machine learning model may determine whether there is a matching document portion that corresponds to a first sentence of an abstract section of an electronic document. The machine learning model may identify keywords within the portion of media content, such as "abstract," and determine that the abstract keyword refers to a section within a patent application document type. The content correlation service 134 may send to the document management service 105 a reference to the portion of media content and a matching document portion. The corresponding document portion may be a reference to the document portion and/or a positional location within the electronic document corresponding to the matching document portion.

Upon identifying the document portion that corresponds to the portion of media content, the document management system 100 may proceed to decision diamond 1008 to determine whether there are additional portions of media content that need to be analyzed. If there are additional portions of media content to be analyzed, the document management system 100 may repeat blocks 1010 and 1012. If at decision diamond 1008 there are no additional portions of media content to be analyzed, the document management system 100 may proceed to block 1014.

At block 1014, the document management system 100 may aggregate the portions of media content based upon their associated discussion topics to generate topic sets of portions of media content. In an embodiment, the document management service 105 may generate topic sets of portions of media content based upon matching associated discussion topics. For example, if five portions of media content are associated with the "Review figures and update" discussion topic, then the document management service 105 may generate a topic set of portions of media content for the discussion topic "Review figures and update" and include the five portions of media content within the topic set of portions of media content.

Figure 11:
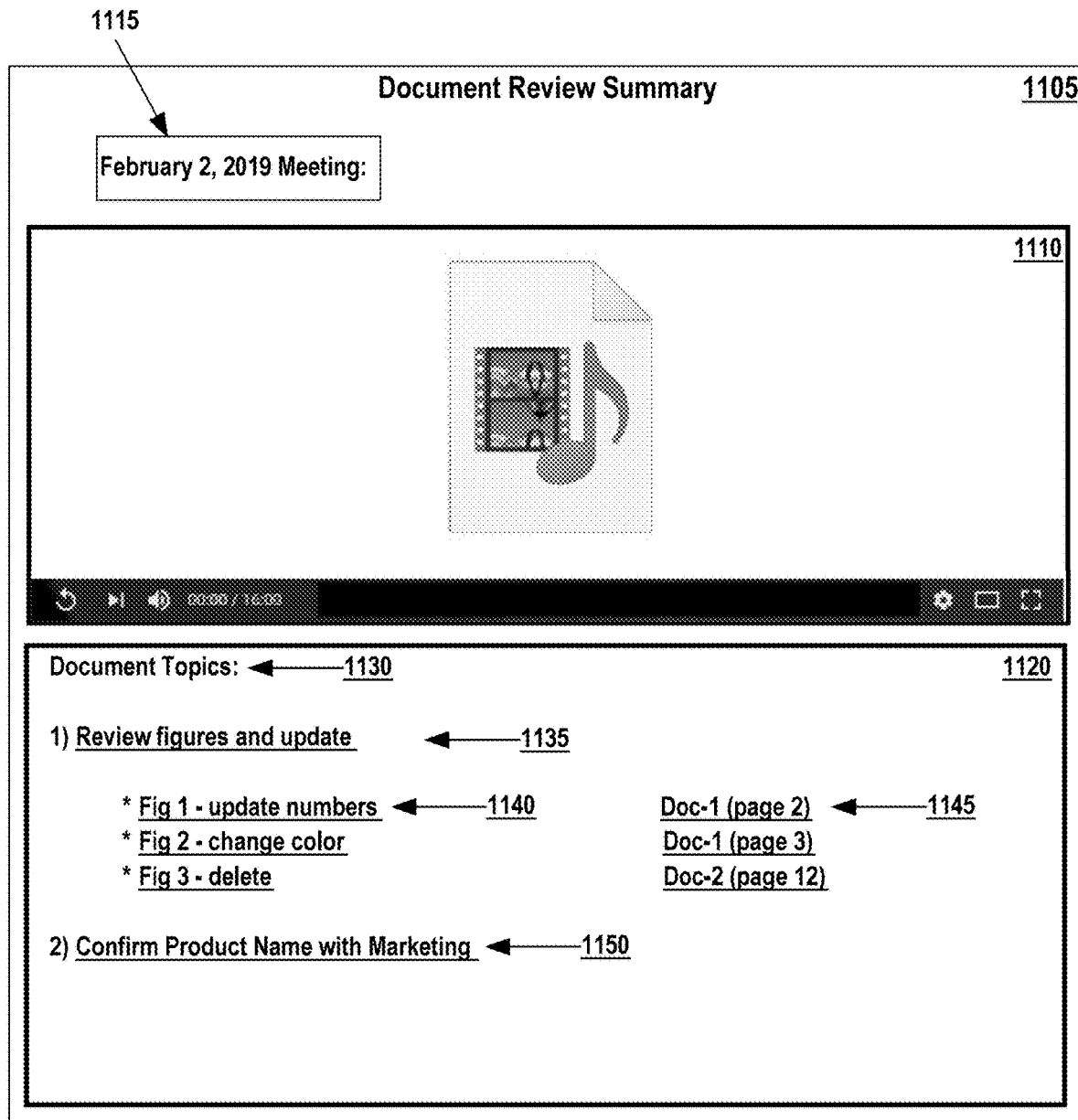
FIG. 11 depicts an example embodiment of a generated meeting summary document.

At block 1016, the document management system 100 may generate a meeting summary document. In an embodiment, the document management service 105 may generate the meeting summary document that includes a list of the discussion topics. FIG. 11 depicts an example embodiment of a display window displaying the generated meeting summary document and a media content item player. Display window 1105 represents a graphical user display that includes a meeting description 1115, a first section 1110, and a second section 1120. The meeting description 1115 may display general details of the review meeting including the date and time of the meeting, the meeting name, the meeting location, and participants. The meeting description 1115 example displayed in the display window 1105 displays the date of the meeting.

The first section 1110 may include a media content item player configured to play the one or more media content items. The media content item player may be configured to with playback controls to rewind, pause, play, fast-forward, and resize buttons to resize the playback window. The media content item player may be configured to playback any type of media content item, including, but not limited to audio files, video files, interactive video files, and any other playable media.

The second section 1120 may include a display of the generated meeting summary document which includes a list of the one or more discussion topics. Document topics 1130 may represent a configurable topic heading that may describe the type of topics listed. In an embodiment, each of the discussion topics listed may be displayed as listed items or as selectable electronic links. Discussion topic 1135 represents the discussion topic "review figures and update". Discussion topic 1150 represents the discussion topic "Confirm product name with marketing", which is displayed as a selectable electronic link. If a user selected the electronic link for discussion topic 1150, the document management system 100 may generate and display a graphical user interface that includes electronic links to the portions of media content associated with the discussion topic 1150.

In an embodiment, portions of media content associated with a discussion topic may be displayed within a sub-list below the discussion topic. For example, a sub-list of three portions of media content are displayed directly under discussion topic 1135. In an embodiment, the associated portions of media content may be displayed as selectable electronic links, which when selected may cause the selected portion of media content to be played back within the media content item player within the first section 1110 of the display window 1105. For example, if the user selected the portion of media content 1140, entitled "FIG. 1—update numbers", then the document management service 105 may cause playback of the media content item, that contains the portion of media content 1140, within the media content item player. Playback of the media content item would be queued to play the portion corresponding to the portion of media content 1140.

In an embodiment, the sub-list displayed under each document topic may also include a list of second electronic links corresponding to the electronic document that contains the document portion that is associated with the portion of media content. For example, the sub-list may display second electronic link 1145 that corresponds to the electronic document "Doc-1" that contains the document portions associated with the "FIG. 1—update numbers" portion of media content 1140. In an embodiment, the second electronic link 1145 may display text indicating the electronic document name and the page number that contains the corresponding document portion. In another embodiment, if the display window 1105 displays a summary document of a meeting discussing a single document, then the display text for the second electronic links within the summary document may only display the page number corresponding to the document portion.

In an embodiment, the document management service 105 may receive a selection request, from a user, selecting the second electronic link 1145. Upon receiving the selection request of the second electronic link 1145, the document management service 105 may open the corresponding electronic document and display the document page that contains the particular document portion corresponding to the second electronic link. For example, the user may select the second electronic link 1145, which may cause the document management service 105 to open "Doc-1" and display page 2 of the electronic document that contains the document portion corresponding to the "FIG. 1—update numbers" suggestion.

In an embodiment, the document management service 105 may receive a request to playback a particular media content item within the media content item player within the first section 1110. The document management service 105, during playback of the particular media content item, may highlight specific discussion topics as they are discussed within the playback of the particular media content item. The document management service 105 may be configured to identify discussion topics based upon timestamps associated with each discussion topic. For example, the document management service 105 may playback the particular media content item and during playback the document management service 105 determines that the timestamp of the playing media content item matches the timestamp associated with discussion topic 1135, then the document management service 105 may highlight discussion topic 1135 within the second section 1120.

In an embodiment, the document management service 105 may be configured to highlight particular portions of media content displayed and/or electronic links of document portions displayed when the timestamp of the playing media content item matches a timestamp associated with the portion of media content. In another embodiment, the document management service 105 may be configured to open the corresponding electronic document and display corresponding document portion in order to synchronize the display of the document portion to the playback of the media content item. For example, if the media content item is played back and the current timestamp of the media content item corresponds to the document portion of the second electronic link 1145, then the document management service 105 may open "Doc-1" and display page 2 of "Doc-1" in order to display the document portion that corresponds to the media being played back.

Referring to FIG. 10, at block 1018, the document management system 100 may present the meeting summary document within a display window. In an embodiment, the document management service 105 may communicate with the document presentation service 150 to generate a graphical user interface for displaying the meeting summary document within the display window on a client computing device.

IV. Implementation Mechanisms

According to one embodiment of the invention, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
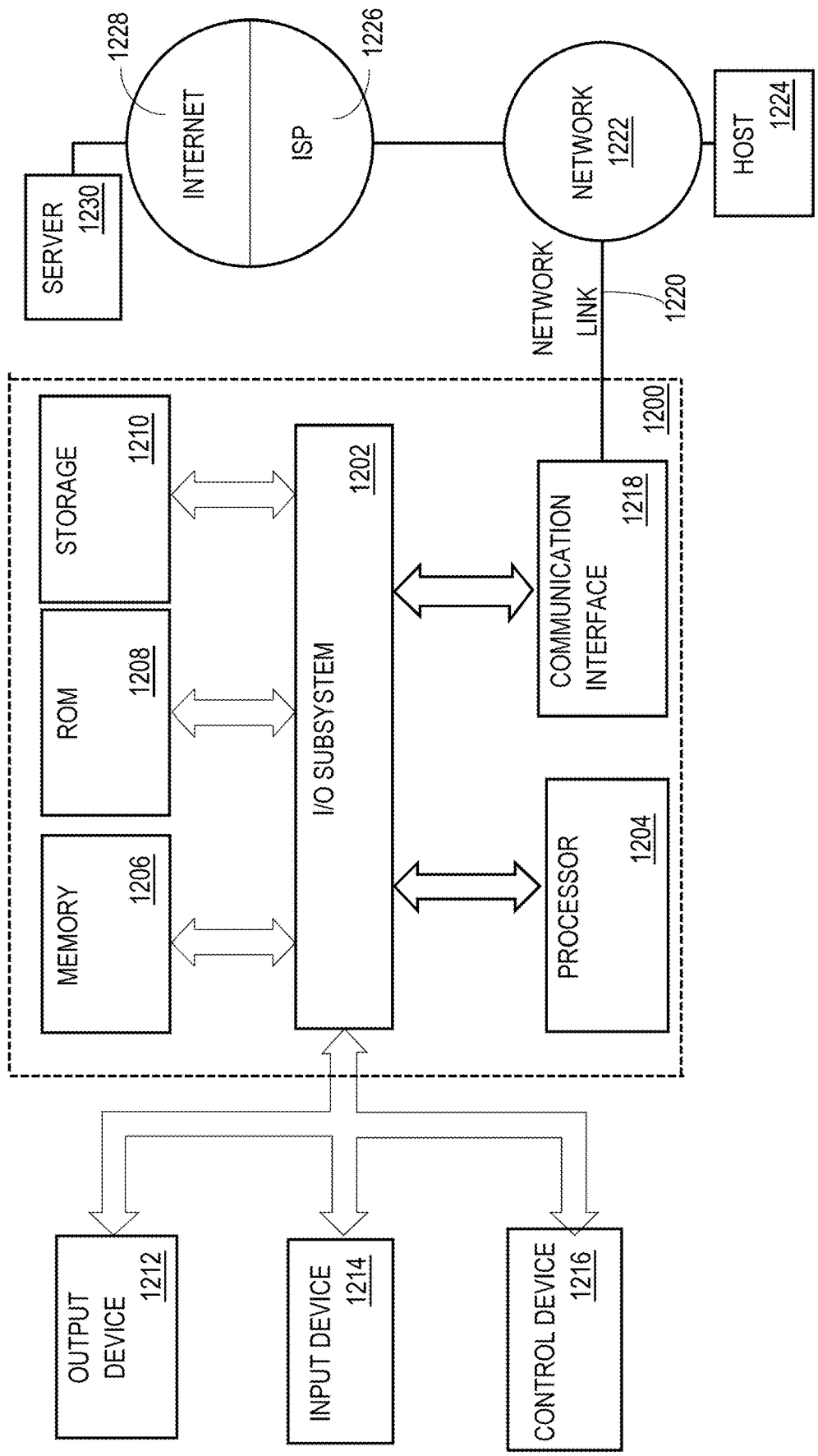
FIG. 12 is a block diagram of a computer system on which embodiments of the invention may be implemented.

FIG. 12 is a block diagram that depicts an example computer system 1200 upon which embodiments of the invention may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. Although bus 1202 is illustrated as a single bus, bus 1202 may comprise one or more buses. For example, bus 1202 may include without limitation a control bus by which processor 1204 controls other devices within computer system 1200, an address bus by which processor 1204 specifies memory locations of instructions for execution, or any other type of bus for transferring data or signals between components of computer system 1200.

An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic or computer software which, in combination with the computer system, causes or programs computer system 1200 to be a special-purpose machine. According to one embodiment of the invention, those techniques are performed by computer system 1200 in response to processor 1204 executing one or more sequences of one or more instructions contained in main memory 1206. Such instructions may be read into main memory 1206 from another computer-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operate in a specific manner. In an embodiment implemented using computer system 1200, various computer-readable media are involved, for example, in providing instructions to processor 1204 for execution. Such a medium may take many forms, including but not limited to, non-volatile media and volatile media. Non-volatile media includes, for example, optical or magnetic disks, such as storage device 1210. Volatile media includes dynamic memory, such as main memory 1206. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218. The received code may be executed by processor 1204 as it is received, and/or stored in storage device 1210, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
   one or more processors; and
   one or more memories storing instructions which, when processed by the one or more processors, cause:
   receiving electronic document data that contains original content from an original electronic document for review and electronic mark-ups provided by a first user;
   analyzing, by a document management service, the electronic document data that contains the original content from the original electronic document for review and the electronic mark-ups provided by the first user to determine one or more electronic mark-ups that represent changes to the original document for review proposed by the first user;
   for each electronic mark-up of the one or more electronic mark-ups that represent changes to the original document for review proposed by the first user:
   determining, by analyzing the electronic document data that contains the original content from the original electronic document for review and the electronic mark-ups that represent changes to the original document for review proposed by the first user, a document portion of the original electronic document that corresponds to the electronic mark-up;
   generating an annotation comprising the electronic mark-up and a first user ID for the first user, and associating the annotation to the document portion of the original electronic document; and
   displaying, in electronic form within a display window, the original content from the original electronic document with one or more annotations generated from the one or more electronic mark-ups;
   wherein determining the document portion comprises:
   using a first machine-learning model, determining document portions within the original electronic document based upon a determined document type associated with the original content and combinations of words within the original content, wherein the first machine-learning model has been trained using a plurality of documents of different document types; and using a second machine-learning model, correlating the document portion of the document portions to the electronic mark-up based upon a relative position of the electronic mark-up and a text transcription of the electronic mark-up, wherein the second machine-learning model has been trained using a plurality of document portions from a plurality of electronic documents and corresponding content suggestions for the plurality of document portions from the plurality of electronic documents.

2. The apparatus of claim 1, wherein analyzing, by the document management service, the electronic document data that contains the original content from the original electronic document for review and the electronic mark-ups provided by the first user to determine one or more electronic mark-ups that represent changes to the original document for review proposed by the first user, comprises:

determining the original content within the electronic document; and determining the one or more electronic mark-ups within the electronic document by determining content that is separate from the original content identified in the electronic document.

3. The apparatus of claim 2, the one or more memories store additional instructions which, when processed by the one or more processors, cause:

using a machine-learning model, for each of the one or more electronic mark-ups that represent changes to the original document for review proposed by the first user, determining electronic mark-up meanings by analyzing combinations of text characters within each of the one or more electronic mark-ups; and using the machine-learning model, determining a content suggestion type for each of the one or more electronic mark-ups that represent changes to the original document for review proposed by the first user, wherein the content suggestion type is one of a comment or a suggested edit.

4. The apparatus of claim 3, the one or more memories store additional instructions which, when processed by the one or more processors, cause:

determining that the annotation for the electronic mark-up corresponds to a suggested edit to the document portion;

calculating a confidence score for the suggested edit, wherein the confidence score represents a level of confidence that the electronic mark-up corresponds to the suggested edit to the document portion;

determining that the confidence score for the suggested edit is above a confidence score threshold for automatically editing the document portion; and automatically editing the document portion to reflect changes proposed in the suggested edit.

5. The apparatus of claim 1, wherein generating the annotation comprises:

determining that the electronic mark-up contains an electronic link to an object, wherein the object is one or more of a file or a webpage; and generating the annotation comprising the electronic mark-up, the first user ID for the first user, and the electronic link the object.

6. The apparatus of claim 1, the one or more memories store additional instructions which, when processed by the one or more processors, cause:

receiving second electronic document data that contains the original content from the original electronic document for review and second electronic mark-ups provided by a second user;

analyzing, by the document management service, the second electronic document that contains the original content from the original electronic document for review and the second electronic mark-ups provided by the second user, one or more second electronic mark-ups that represent changes to the original document for review proposed by the second user;

for each second electronic mark-up of the one or more second electronic mark-ups that represent changes to the original document for review proposed by the second user:

determining, by analyzing the electronic document data that contains the original content from the original electronic document for review and the electronic mark-ups provided by the first user, a second document portion of the original electronic document that corresponds to the second electronic mark-up;

generating a second annotation comprising the second electronic mark-up and a second user ID for the second user, and associating the second annotation to the second document portion of the original document.

7. One or more non-transitory computer-readable media storing instructions which, when processed by one or more processors, cause:

receiving electronic document data that contains original content from an original electronic document for review and electronic mark-ups provided by a first user;

analyzing, by a document management service, the electronic document data that contains the original content from the original electronic document for review and the electronic mark-ups provided by the first user to determine one or more electronic mark-ups that represent changes to the original document for review proposed by the first user;

wherein analyzing comprises:

determining the original content within the electronic document; and determining the one or more electronic mark-ups within the electronic document by identifying content that is separate from the original content identified in the electronic document;

for each electronic mark-up of the one or more electronic mark-ups that represent changes to the original document for review proposed by the first user:

determining, by analyzing the electronic document data that contains the original content from the original electronic document for review and the electronic mark-ups that represent changes to the original document for review proposed by the first user, a document portion of the original electronic document that corresponds to the electronic mark-up;

generating an annotation comprising the electronic mark-up and a first user ID for the first user, and associating the annotation to the document portion of the original electronic document; and displaying, in electronic form within a display window, the original content from the original electronic document with one or more annotations generated from the one or more electronic mark-ups;

using a machine-learning model, for each of the one or more electronic mark-ups that represent changes to the original document for review proposed by the first user, determining electronic mark-up meanings by analyzing combinations of text characters within each of the one or more electronic mark-ups; and using the machine-learning model, determining a content suggestion type for each of the one or more electronic mark-ups that represent changes to the original document for review proposed by the first user, wherein the content suggestion type is one of a comment or a suggested edit;

determining that the annotation for the electronic mark-up corresponds to a suggested edit to the document portion;

calculating a confidence score for the suggested edit, wherein the confidence score represents a level of confidence that the electronic mark-up corresponds to the suggested edit to the document portion;

determining that the confidence score for the suggested edit is above a confidence score threshold for automatically editing the document portion; and automatically editing the document portion to reflect changes proposed in the suggested edit.

8. The one or more non-transitory computer-readable media of claim 7, wherein generating the annotation comprises:

determining that the electronic mark-up contains an electronic link to an object, wherein the object is one or more of a file or a webpage; and generating the annotation comprising the electronic mark-up, the first user ID for the first user, and the electronic link the object.

9. The one or more non-transitory computer-readable media of claim 7, wherein determining, by analyzing the electronic document data that contains the original content from the original electronic document for review and the electronic mark-ups provided by the first user, the document portion of the original electronic document that corresponds to the electronic mark-up, comprises:

using a first machine-learning model, determining document portions within the original electronic document based upon a determined document type associated with the original content and combinations of words within the original content, wherein the first machine-learning model has been trained using a plurality of documents of different document types; and using a second machine-learning model, correlating the document portion of the document portions to the electronic mark-up based upon a relative position of the electronic mark-up and a text transcription of the electronic mark-up, wherein the second machine-learning model has been trained using a plurality of document portions from a plurality of electronic documents and corresponding content suggestions for the plurality of document portions from the plurality of electronic documents.

10. The one or more non-transitory computer-readable media of claim 7, further comprising additional instructions which, when processed by the one or more processors, cause:

receiving second electronic document data that contains the original content from the original electronic document for review and second electronic mark-ups provided by a second user;

analyzing, by the document management service, the second electronic document that contains the original content from the original electronic document for review and the second electronic mark-ups provided by the second user, one or more second electronic mark-ups that represent changes to the original document for review proposed by the second user;

for each second electronic mark-up of the one or more second electronic mark-ups that represent changes to the original document for review proposed by the second user:

determining, by analyzing the electronic document data that contains the original content from the original electronic document for review and the electronic mark-ups provided by the first user, a second document portion of the original electronic document that corresponds to the second electronic mark-up;

generating a second annotation comprising the second electronic mark-up and a second user ID for the second user, and associating the second annotation to the second document portion of the original document.

11. A computer-implemented method comprising:

receiving electronic document data that contains original content from an original electronic document for review and electronic mark-ups provided by a first user;

analyzing, by a document management service, the electronic document data that contains the original content from the original electronic document for review and the electronic mark-ups provided by the first user to determine one or more electronic mark-ups that represent changes to the original document for review proposed by the first user;

for each electronic mark-up of the one or more electronic mark-ups that represent changes to the original document for review proposed by the first user:

determining, by analyzing the electronic document data that contains the original content from the original electronic document for review and the electronic mark-ups that represent changes to the original document for review proposed by the first user, a document portion of the original electronic document that corresponds to the electronic mark-up;

generating an annotation comprising the electronic mark-up and a first user ID for the first user, and associating the annotation to the document portion of the original electronic document; and displaying, in electronic form within a display window, the original content from the original electronic document with one or more annotations generated from the one or more electronic mark-ups;

wherein determining the document portion comprises:

using a first machine-learning model, determining document portions within the original electronic document based upon a determined document type associated with the original content and combinations of words within the original content, wherein the first machine-learning model has been trained using a plurality of documents of different document types; and using a second machine-learning model, correlating the document portion of the document portions to the electronic mark-up based upon a relative position of the electronic mark-up and a text transcription of the electronic mark-up, wherein the second machine-learning model has been trained using a plurality of document portions from a plurality of electronic documents and corresponding content suggestions for the plurality of document portions from the plurality of electronic documents.

12. The computer-implemented method of claim 11, wherein analyzing, by the document management service, the electronic document data that contains the original content from the original electronic document for review and the electronic mark-ups provided by the first user to determine one or more electronic mark-ups that represent changes to the original document for review proposed by the first user, comprises:
- determining the original content within the electronic document; and
- determining the one or more electronic mark-ups within the electronic document by identifying content that is separate from the original content identified in the electronic document.

13. The computer-implemented method of claim 12, further comprising:
- using a machine-learning model, for each of the one or more electronic mark-ups that represent changes to the original document for review proposed by the first user, determining electronic mark-up meanings by analyzing combinations of text characters within each of the one or more electronic mark-ups; and
- using the machine-learning model, determining a content suggestion type for each of the one or more electronic mark-ups that represent changes to the original document for review proposed by the first user, wherein the content suggestion type is one of a comment or a suggested edit.

14. The computer-implemented method of claim 13, further comprising:
- determining that the annotation for the electronic mark-up corresponds to a suggested edit to the document portion;
- calculating a confidence score for the suggested edit, wherein the confidence score represents a level of confidence that the electronic mark-up corresponds to the suggested edit to the document portion;
- determining that the confidence score for the suggested edit is above a confidence score threshold for automatically editing the document portion; and
- automatically editing the document portion to reflect changes proposed in the suggested edit.

15. The computer-implemented method of claim 11, wherein generating the annotation comprises:
- determining that the electronic mark-up contains an electronic link to an object, wherein the object is one or more of a file or a webpage; and
- generating the annotation comprising the electronic mark-up, the first user ID for the first user, and the electronic link the object.

* * * * *